(12) United States Patent
Yuwaki et al.

(10) Patent No.: US 10,994,482 B2
(45) Date of Patent: May 4, 2021

(54) THREE-DIMENSIONAL SHAPING APPARATUS

(71) Applicant: SEIKO EPSON CORPORATION, Tokyo (JP)

(72) Inventors: Kohei Yuwaki, Tsukuba (JP); Koichi Saito, Matsumoto (JP); Kazuhide Nakamura, Asahi-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/722,539

(22) Filed: Dec. 20, 2019

(65) Prior Publication Data

US 2020/0207017 A1    Jul. 2, 2020

(30) Foreign Application Priority Data

Dec. 27, 2018  (JP) .............................. JP2018-244829

(51) Int. Cl.
*B29C 64/209*    (2017.01)
*B29C 64/245*    (2017.01)
(Continued)

(52) U.S. Cl.
CPC .......... *B29C 64/209* (2017.08); *B29C 64/227* (2017.08); *B29C 64/245* (2017.08); *B29C 64/295* (2017.08); *B33Y 30/00* (2014.12)

(58) Field of Classification Search
CPC . B29C 64/106; B29C 48/2528; B29C 64/343; B29C 48/30; B29C 48/00;
(Continued)

(56) References Cited

U.S. PATENT DOCUMENTS 4,107,246 A * 8/1978 LaSpisa ............... G05D 7/0605
                                                       264/40.7
5,633,021 A * 5/1997 Brown .................... B29C 64/40
                                                       425/375
(Continued)

FOREIGN PATENT DOCUMENTS

EP    2772347 A1 *  9/2014 ........... B29C 64/106
EP    3581365 A1 * 12/2019 ........... B29C 64/112
(Continued)

*Primary Examiner* — Joseph S Del Sole
*Assistant Examiner* — Margaret B Hayes
(74) *Attorney, Agent, or Firm* — Chip Law Group

(57) ABSTRACT

A three-dimensional shaping apparatus includes a discharge mechanism, a tilting mechanism, and a control portion. the discharge mechanism includes a supply flow path, a first branch flow path, a second branch flow path, a coupling portion coupling the supply flow path with the first branch flow path and the second branch flow path, a first nozzle communicating with the first branch flow path, a second nozzle communicating with the second branch flow path, and a valve mechanism, a central axis of the first nozzle and a central axis of the second nozzle are separated from each other as going toward the table, and the control portion controls the valve mechanism to switch between a first state in which the supply flow path and the first branch flow path communicate with each other and the supply flow path and the second branch flow path are blocked from each other and a second state in which the supply flow path and the second branch flow path communicate with each other and the supply flow path and the first branch flow path are blocked from each other and controls the tilting mechanism so that in the first state, the first nozzle is brought closer to the table than the second nozzle and in the second state, the second nozzle is brought closer to the table than the first nozzle.

7 Claims, 13 Drawing Sheets

(51) Int. Cl.
*B29C 64/295* (2017.01)
*B29C 64/227* (2017.01)
*B33Y 30/00* (2015.01)

(58) Field of Classification Search
CPC ......... B29C 48/92; B29C 48/02; B29C 64/20; B29C 64/321; B29C 64/118; B29C 64/209; B29C 45/27; B33Y 50/02; B33Y 10/00; B33Y 30/00; B33Y 40/00; B29B 7/248
See application file for complete search history.

(56) References Cited

U.S. PATENT DOCUMENTS

| | | | |
|---|---|---|---|
| 5,641,526 A | 6/1997 | Gellert | |
| 6,019,916 A * | 2/2000 | Mizuguchi | B29C 48/2554 264/39 |
| 8,961,167 B2 * | 2/2015 | Swanson | B29C 64/112 425/375 |
| 2014/0291886 A1 * | 10/2014 | Mark | B29C 69/001 264/163 |
| 2016/0009010 A1 * | 1/2016 | Kariya | B29B 7/248 264/328.18 |
| 2016/0046073 A1 * | 2/2016 | Hadas | B29C 64/241 264/211.21 |
| 2017/0157828 A1 * | 6/2017 | Mandel | B29C 64/343 |
| 2017/0210069 A1 * | 7/2017 | Stubenruss | B29C 64/118 |

FOREIGN PATENT DOCUMENTS

| | | | |
|---|---|---|---|
| FR | 3024958 A1 * | 2/2016 | ............ B29C 64/118 |
| FR | 3024958 B1 | 8/2017 | |
| JP | H09-220736 A | 8/1997 | |
| JP | 2006-192710 A | 7/2006 | |
| JP | 2009137260 A1 * | 6/2009 | |
| WO | 2018158239 A1 | 9/2018 | |
| WO | WO-2018158239 A1 * | 9/2018 | ............ B29C 64/118 |

* cited by examiner

THREE-DIMENSIONAL SHAPING APPARATUS

The present application is based on, and claims priority from JP Application Serial Number 2018-244829, filed Dec. 27, 2018, the disclosure of which is hereby incorporated by reference herein in its entirety.

BACKGROUND

1. Technical Field

The present disclosure relates to a three-dimensional shaping apparatus.

2. Related Art

JP-A-2006-192710 discloses a three-dimensional shaping apparatus in which a melted thermoplastic material is extruded from an extrusion nozzle which scans in accordance with preset shape data onto a base and the melted material is further stacked on the cured material on the base to make a three-dimensional shaping object.

In the three-dimensional shaping apparatus described above, since the three-dimensional shaping object is formed by one nozzle, when a nozzle with a small diameter is used to improve shaping precision, a shaping speed is lowered, and when a nozzle with a large diameter is used to improve the shaping speed, the shaping precision is lowered.

Therefore, the inventors of the present disclosure considered to achieve both improvement of the shaping precision and improvement of the shaping speed, by providing the nozzle with a large diameter and the nozzle with a small diameter in the three-dimensional shaping apparatus and shaping the three-dimensional shaping object while the nozzles are switched.

Further, in the three-dimensional shaping apparatus described above, since the three-dimensional shaping object is shaped by one nozzle, if the nozzle fails due to a discharge failure or the like, the shaping of the three-dimensional shaping object needs to be stopped for repair, replacement, or the like of the nozzle, resulting in a decrease in productivity.

Therefore, the inventors of the present disclosure also studied to suppress a decrease in productivity by providing two nozzles of the same diameter in the three-dimensional shaping apparatus.

However, the inventors of the present disclosure found a problem that in such a multi-nozzle three-dimensional shaping apparatus, when one nozzle is used to shape the three-dimensional shaping object while the other nozzle is stopped, the other nozzle may interfere with the object and affect the shaping precision.

SUMMARY

An advantage of some aspects of the present disclosure is to provide a technology suppressing interference of the nozzle in a stop state with the three-dimensional shaping object in the multi-nozzle three-dimensional shaping apparatus.

According to one aspect of the present disclosure, a three-dimensional shaping apparatus is provided. The three-dimensional shaping apparatus includes a discharge mechanism discharging a shaping material, a table on which the shaping material discharged from the discharge mechanism is stacked, a tilting mechanism tilting the discharge mechanism with respect to the table, and a control portion controlling the discharge mechanism and the tilting mechanism. The discharge mechanism includes a melting portion melting a material to be used as the shaping material, a supply flow path through which the shaping material supplied from the melting portion flows, a first branch flow path and a second branch flow path to which the shaping material is supplied from the supply flow path, a coupling portion coupling the supply flow path with the first branch flow path and the second branch flow path, a first nozzle communicating with the first branch flow path and a second nozzle communicating with the second branch flow path, and a valve mechanism provided in the connection portion, the first nozzle and the second nozzle are disposed in a direction in which a central axis of the first nozzle and a central axis of the second nozzle are separated from each other as going toward the table, the control portion controls the valve mechanism of the discharge mechanism to switch between a first state in which the supply flow path and the first branch flow path communicate with each other and the supply flow path and the second branch flow path are blocked from each other and a second state in which the supply flow path and the second branch flow path communicate with each other and the supply flow path and the first branch flow path are blocked from each other, and the control portion controls the tilting mechanism so that in the first state, the first nozzle is brought closer to the table than the second nozzle and in the second state, the second nozzle is brought closer to the table than the first nozzle.

DESCRIPTION OF EXEMPLARY EMBODIMENTS

A. First Embodiment

Figure 1:
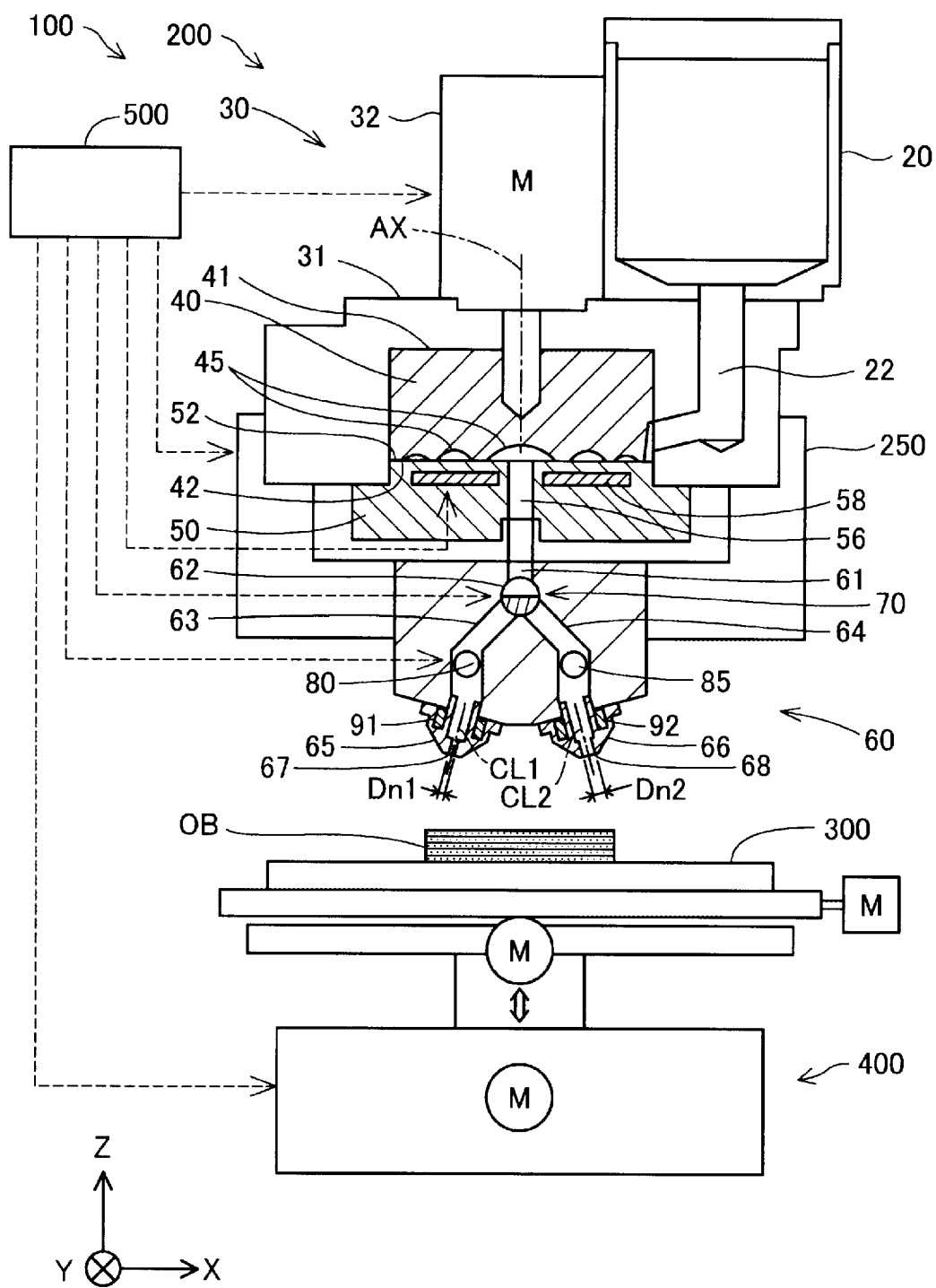
FIG. 1 is an explanatory view showing a schematic configuration of a three-dimensional shaping apparatus according to a first embodiment.

FIG. 1 is an explanatory view showing a schematic configuration of a three-dimensional shaping apparatus 100 in a first embodiment. In FIG. 1, arrows along X, Y, and Z directions orthogonal to one another are represented. The X direction and the Y direction are directions along a horizontal direction, and the Z direction is a direction along a vertical direction. In the other figures, arrows along the X, Y, and Z directions are appropriately represented. The X, Y, and Z directions in FIG. 1 and the X, Y, and Z directions in the other figures represent the same direction.

The three-dimensional shaping apparatus 100 in the present embodiment includes a discharge unit 200, a tilting mechanism 250, a shaping table 300, a movement mechanism 400, and a control portion 500. The three-dimensional shaping apparatus 100 shapes a three-dimensional shaping object having a desired shape on the shaping table 300 by changing a relative position between first and second nozzles 65 and 66 and the shaping table 300 by the movement mechanism 400 while discharging a shaping material from the first nozzle 65 or the second nozzle 66 provided in the discharge unit 200 toward the shaping table 300, under control of the control portion 500. In the present embodiment, the control portion 500 shapes the three-dimensional shaping object while switching between whether to discharge the shaping material from the first nozzle 65 and whether to discharge the shaping material from the second nozzle 66. In the present embodiment, the first nozzle 65 and the second nozzle 66 are disposed in a direction such that a central axis CL1 of the first nozzle 65 and a central axis CL2 of the second nozzle are separated from each other as going toward the shaping table 300. The central axis CL1 of the first nozzle 65 means a central axis of a first nozzle hole 67 provided at a tip of the first nozzle 65. The central axis CL2 of the second nozzle 66 means a central axis of a second nozzle hole 68 provided at a tip of the second nozzle 66. A discharge unit is sometimes called a discharge mechanism. The shaping table 300 may be simply called a table.

The tilting mechanism 250 tilts the discharge unit 200 with respect to the shaping table 300. In the present embodiment, the tilting mechanism 250 supports the discharge unit 200, and tilts the discharge unit 200 with respect to the shaping table 300 by rotating the discharge unit 200 around an axis parallel to the Y axis. In the present embodiment, the tilting mechanism 250 rotates the discharge unit 200 around a central axis CA of a valve portion 71 of a valve mechanism 70 described later. The tilting mechanism 250 rotates the discharge unit 200 by drive force of a motor. The motor is driven under the control of the control portion 500. The tilting mechanism 250 may be configured to rotate the shaping table 300 without rotating the discharge unit 200. The tilting mechanism 250 may be configured to rotate both the discharge unit 200 and the shaping table 300.

The movement mechanism 400 changes a relative position between the discharge unit 200 and the shaping table 300. In the present embodiment, the movement mechanism 400 moves the shaping table 300 with respect to the discharge unit 200. The movement mechanism 400 in the present embodiment is constituted with a three-axis positioner which moves the shaping stage 300 in the three directions of the X, Y, and Z directions by drive force of three motors. Each motor is driven under the control of the control portion 500. The movement mechanism 400 may not be configured to move the shaping table 300 but may be configured to move the discharge unit 200 without moving the shaping table 300. The movement mechanism 400 may be configured to move both the discharge unit 200 and the shaping table 300.

The control portion 500 is constituted with a computer including one or more processors, a main storage apparatus, and an I/O interface inputting/outputting a signal to/from an outside. In the present embodiment, the control portion 500 performs various functions by the processor executing a program and an instruction read on the main storage apparatus. The control portion 500 may be constituted with a combination of a plurality of circuits instead of the computer.

The discharge unit 200 includes a material supply portion 20, a melting portion 30, and a discharge portion 60. The material supply portion 20 stores a material in a form of pellet, powder, or the like. The material in the present embodiment is a pellet-like ABS resin. The material supply portion 20 in the present embodiment is constituted with a hopper. The material supply portion 20 is coupled with the melting portion 30 by a supply path 22 provided below the material supply portion 20. The material input to the material supply portion 20 is supplied to the melting portion 30 via the supply path 22.

The melting portion 30 includes a screw case 31, a drive motor 32, a flat screw 40, and a barrel 50. The melting portion 30 melts at least a part of a solid material supplied from the material supply portion 20 and turns the material into a paste-like shaping material having fluidity, and supplies the material to the first nozzle 65 and the second nozzle 66. The flat screw 40 may be simply called a screw.

The screw case 31 is a casing accommodating the flat screw 40. The drive motor 32 is fixed to an upper surface of the screw case 31. The drive motor 32 is coupled to an upper surface 41 of the flat screw 40.

The flat screw 40 has a substantially cylindrical shape in which a height of a direction along a central axis AX is smaller than a diameter thereof. The flat screw 40 is disposed in the screw case 31 so that the central axis AX is parallel to the Z direction. The flat screw 40 rotates around the central axis AX in the screw case 31 by a torque generated by the drive motor 32.

The flat screw 40 has a grooved surface 42 on an opposite side to the upper surface 41 in a direction along the central axis AX. A groove portion 45 is formed on the grooved surface 42. A detailed shape of the grooved surface 42 of the flat screw 40 will be described later with reference to FIG. 7.

The barrel 50 is provided below the flat screw 40. The barrel 50 has a screw facing surface 52 facing the grooved surface 42 of the flat screw 40. In the barrel 50, a heater 58 is embedded in a position facing the groove portion 45 of the flat screw 40. The temperature of the heater 58 is controlled by the control portion 500. In addition, the heater 58 may be called a heating portion.

A communication hole 56 is provided at a center of the screw facing surface 52. The communication hole 56 communicates with the discharge portion 60. A detailed shape of the screw facing surface 52 of the barrel 50 will be described later with reference to FIG. 8.

The discharge portion 60 includes a supply flow path 61 which communicates with the communication hole 56 of the barrel 50 and through which the shaping material supplied from the melting portion 30 flows, a first branch flow path 63 and a second branch flow path 64 through which the shaping material is supplied from the supply flow path 61, a coupling portion 62 coupling the supply flow path 61 with the first branch flow path 63 and the second branch flow path 64, the first nozzle 65 communicating with the first branch flow path 63, the second nozzle 66 communicating with the second branch flow path 64, and the valve mechanism 70 provided in the connection portion 62. The shaping material supplied to the discharge portion 60 is discharged from one of the first nozzle 65 and the second nozzle 66 toward the shaping table 300. Whether the shaping material is discharged from the first nozzle 65 or the second nozzle 66 is switched by the valve mechanism 70.

In the present embodiment, a nozzle diameter Dn2 of the second nozzle 66 is larger than a nozzle diameter Dn1 of the first nozzle 65. The nozzle diameter Dn1 of the first nozzle 65 is a minimum diameter in the first nozzle hole 67, and the nozzle diameter Dn2 of the second nozzle 66 is a minimum diameter in the second nozzle hole 68. The first nozzle hole 67 is a reduced portion of a flow path cross section provided at an end portion of the first nozzle 65 on a side communicating with the atmosphere. The second nozzle hole 68 is a reduced portion of a flow path cross section provided at an end portion of the second nozzle 66 on a side communicating with the atmosphere. In the present embodiment, a shape of the first nozzle hole 67 and a shape of the second nozzle hole 68 are circular.

In the present embodiment, the discharge portion 60 is provided with a first nozzle heater 91 which heats the first nozzle 65 and a second nozzle heater 92 which heats the second nozzle 66. In the first nozzle heater 91 and the second nozzle heater 92, heating is switched on and off by the control portion 500. By heating the first nozzle 65 using the first nozzle heater 91, fluidity of the shaping material in the first nozzle 65 can be increased. By heating the second nozzle 66 using the second nozzle heater 92, fluidity of the shaping material in the second nozzle 66 can be increased.

In the present embodiment, the discharge portion 60 is provided with a first suction portion 80 coupled to the first branch flow path 63 and a second suction portion 85 coupled to the second branch flow path 64. The first suction portion 80 is configured to suck the shaping material in the first branch flow path 63. The second suction portion 85 is configured to suck the shaping material in the second branch flow path 64. Specific configurations of the first suction portion 80 and the second suction portion 85 will be described later with reference to FIG. 6.

Figure 2:
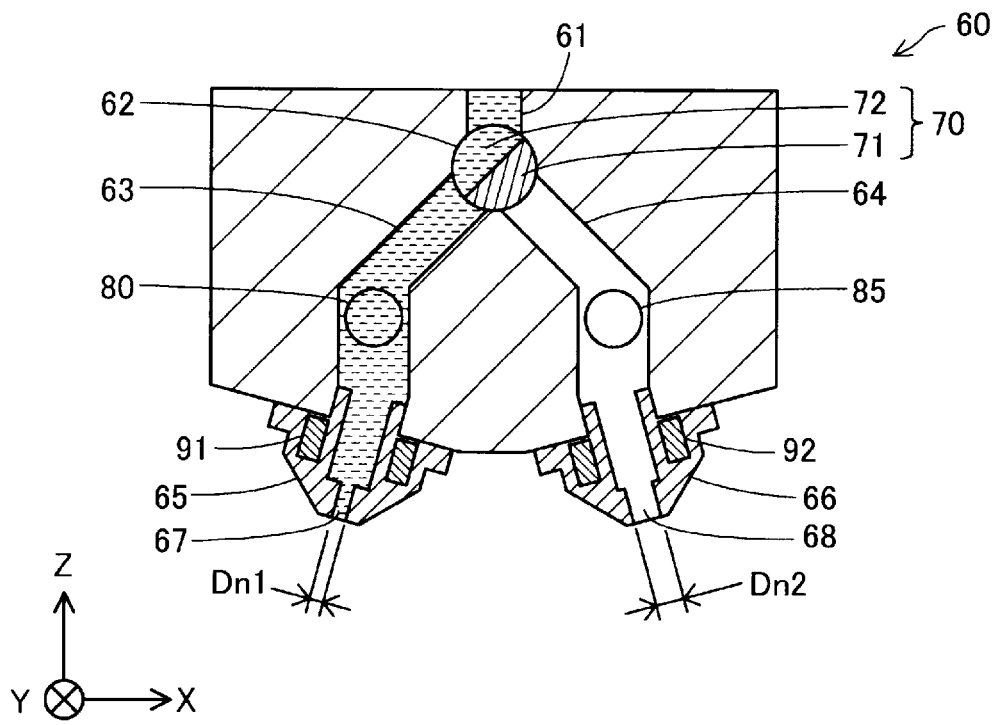
FIG. 2 is a schematic sectional view showing a schematic configuration of a valve mechanism in a first state.
Figure 3:
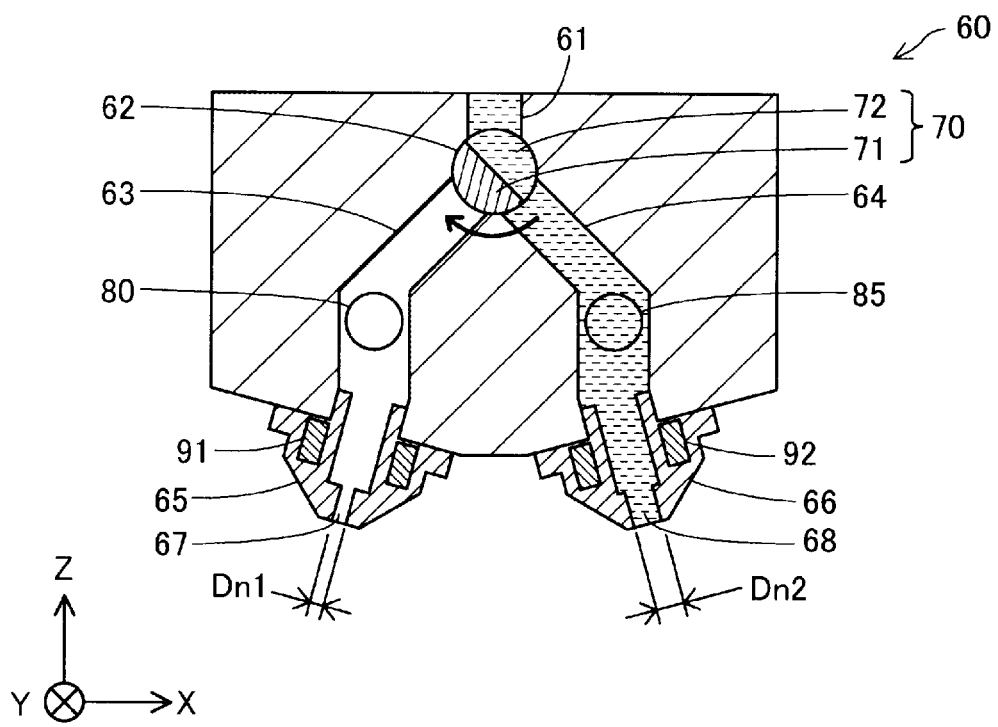
FIG. 3 is a schematic sectional view showing a schematic configuration of the valve mechanism in a second state.
Figure 4:
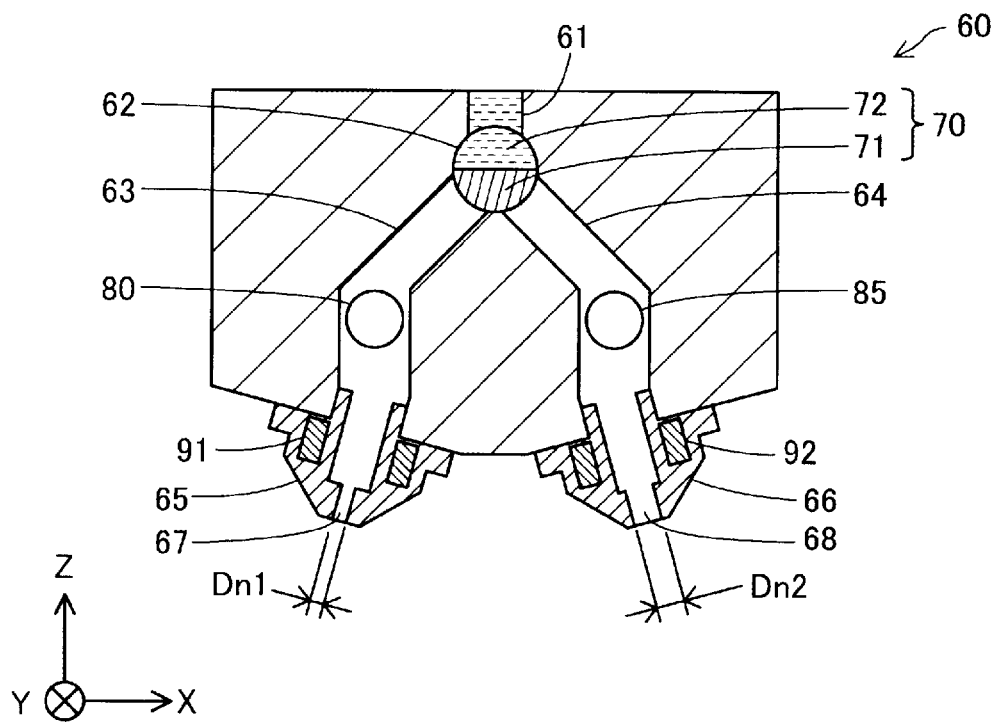
FIG. 4 is a schematic sectional view showing a schematic configuration of the valve mechanism in a third state.

FIG. 2 is a schematic sectional view showing a schematic configuration of the valve mechanism 70 in a first state. FIG. 3 is a schematic sectional view showing a schematic configuration of the valve mechanism 70 in a second state. FIG. is a schematic sectional view showing a schematic configuration of the valve mechanism 70 in a third state. The first state means a state of the discharge unit 200 in which the supply flow path 61 and the first branch flow path 63 communicate with each other and the supply flow path 61 and the second branch flow path 64 are blocked from each other. The second state means a state of the discharge unit 200 in which the supply flow path 61 and the second branch flow path 64 communicate with each other and the supply flow path 61 and the first branch flow path 63 are blocked from each other. The third state means a state of the discharge unit 200 in which the supply flow path 61 and the first branch flow path 63 are blocked from each other and the supply flow path 61 and the second branch flow path 64 are blocked from each other.

The valve mechanism 70 is a valve configured to be switchable between the first state, the second state, and the third state. The valve mechanism 70 is configured to be rotatable in the connection portion 62 and includes the valve portion 71 having a flow passage 72 through which the shaping material can flow. According to rotation of the valve portion 71, one of the first branch flow path 63 and the second branch flow path 64 communicates with the supply flow path 61 through the flow passage 72, and the other is blocked from the supply flow path 61 by the valve portion 71, so that the first state and the second state are switched. Further, the valve portion 71 blocks the supply flow path 61 and the first branch flow path 63 from each other and the supply flow path 61 and the second branch flow path 64 from each other, thereby switching to the third state. Further, the valve mechanism 70 of the present embodiment adjusts a first flow rate of the shaping material flowing into the first branch flow path 63 in the first state and a second flow rate of the shaping material flowing into the second branch flow path 64 in the second state by adjusting rotation angle of the valve portion 71.

Figure 5:
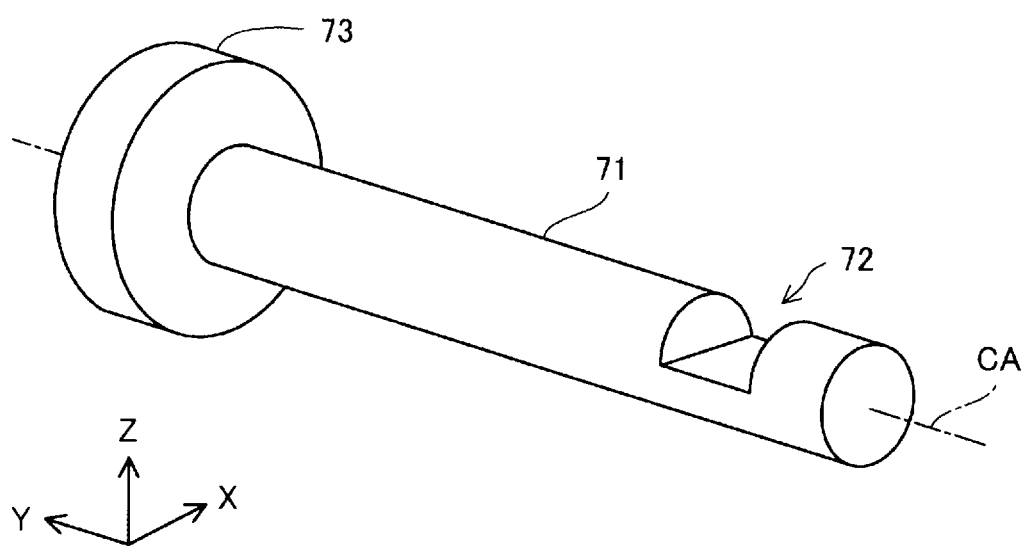
FIG. 5 is a perspective view showing a schematic configuration of a valve portion according to the first embodiment.

FIG. 5 is a perspective view showing the valve portion 71 according to the present embodiment. The valve portion 71 of the present embodiment has a cylindrical shape having the central axis CA. The flow passage 72 is provided by cutting off a part of a side surface of the valve portion 71. An operation portion 73 is provided at an end portion of the valve portion 71. A motor which is driven under the control of the control portion 500 is coupled to the operation portion 73. The valve portion 71 rotates as a torque by the motor is applied to the operation portion 73.

Figure 6:
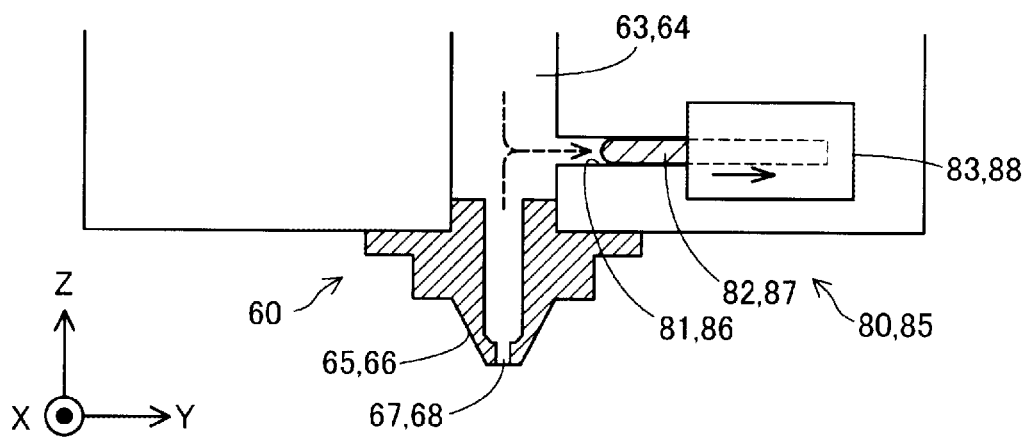
FIG. 6 is an explanatory view showing a schematic configuration of a suction portion according to the first embodiment.

FIG. 6 is an explanatory view showing a schematic configuration of the first suction portion 80. In the present embodiment, the first suction portion 80 includes a cylindrical first cylinder 81 coupled to the first branch flow path 63, a first plunger 82 accommodated in the first cylinder 81, and a first plunger drive portion 83 driving the first plunger 82. In the present embodiment, the first plunger drive portion 83 is constituted with a motor which is driven under the control of the control portion 500 and a rack and pinion which converts rotation of the motor into translational direction movement along an axial direction of the first cylinder 81. The first plunger drive portion 83 may be constituted with the motor which is driven under the control of the control portion 500 and a ball screw which converts the rotation of the motor into the translational direction movement along the axial direction of the first cylinder 81, or may be constituted with a solenoid mechanism or an actuator such as a piezo element.

As indicated by the arrows in FIG. 6, when the first plunger 82 moves in a direction away from the first branch flow path 63, the inside of the first cylinder 81 becomes negative pressure, so that the shaping material from the first branch flow path 63 to the first nozzle 65 is sucked into the first cylinder 81. On the other hand, when the first plunger 82 moves in a direction approaching the first branch flow path 63, the shaping material in the first cylinder 81 is extruded to the first branch flow path 63 by the first plunger 82.

The second suction portion 85 includes a cylindrical second cylinder 86 coupled to the second branch flow path 64, a second plunger 87 accommodated in the second cylinder 86, and a second plunger drive portion 88 driving the second plunger 87. Since configuration and operation of the second suction portion 85 are the same as those of the first suction portion 80, description thereof is omitted.

Figure 7:
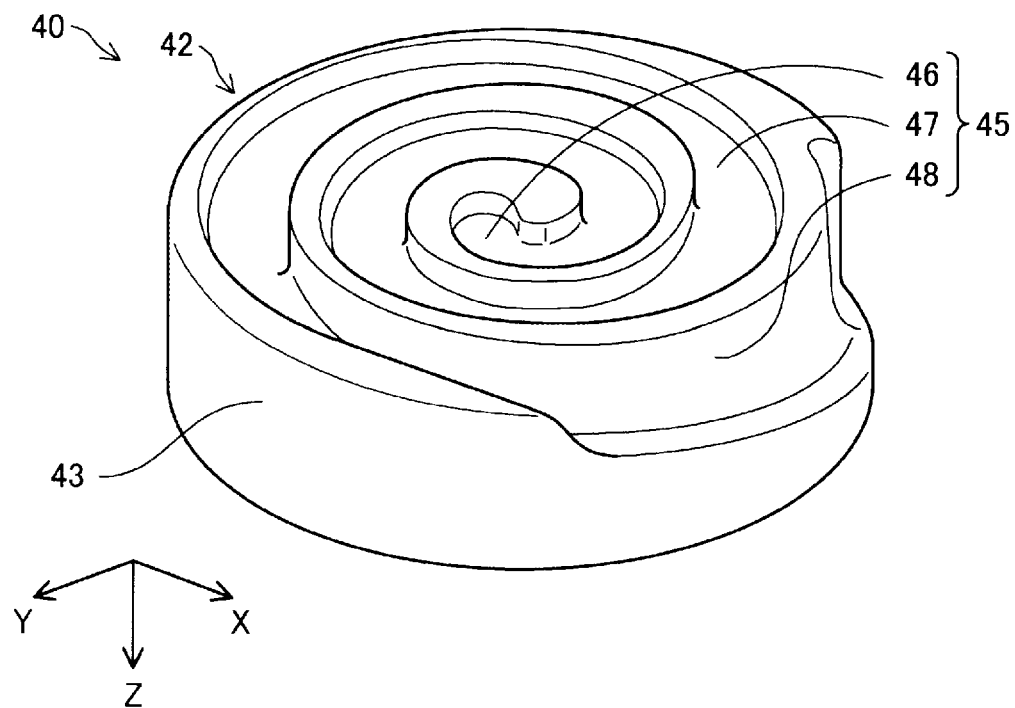
FIG. 7 is a perspective view showing a configuration of a grooved surface of a flat screw according to the first embodiment.

FIG. 7 is a perspective view showing a configuration of the grooved surface 42 of the flat screw 40 according to the present embodiment. The flat screw 40 shown in FIG. 7 is shown in a state in which the vertical positional relationship shown in FIG. 1 is reversed in order to facilitate understanding of the technology. As described above, the groove portion 45 is formed on the grooved surface 42 of the flat screw 40. The groove portion 45 has a center portion 46, a spiral portion 47, and a material introduction portion 48.

The center portion 46 is a circular depression formed around the central axis AX of the flat screw 40. The center portion 46 faces the communication hole 56 provided in the barrel 50.

The spiral portion 47 is a groove extending in a spiral shape so as to draw an arc toward an outer circumferential side of the grooved surface 42 with the center portion 46 as a center. The spiral portion 47 may be configured to extend in an involute curve shape or a spiral shape. One end of the spiral portion 47 is coupled to the center portion 46. The other end of the spiral portion 47 is connected to the material introduction portion 48. Although FIG. 7 shows a form in which the flat screw 40 is provided with one spiral portion 47, the flat screw 40 may be provided with a plurality of the spiral portions 47.

The material introduction portion 48 is a groove provided on the outer peripheral edge of the grooved surface 42 and having a width wider than that of the spiral portion 47. The material introduction portion 48 continues to a side surface 43 of the flat screw 40. The material introduction portion 48 introduces the material supplied from the material supply portion 20 via the supply path 22 into the spiral portion 47.

Figure 8:
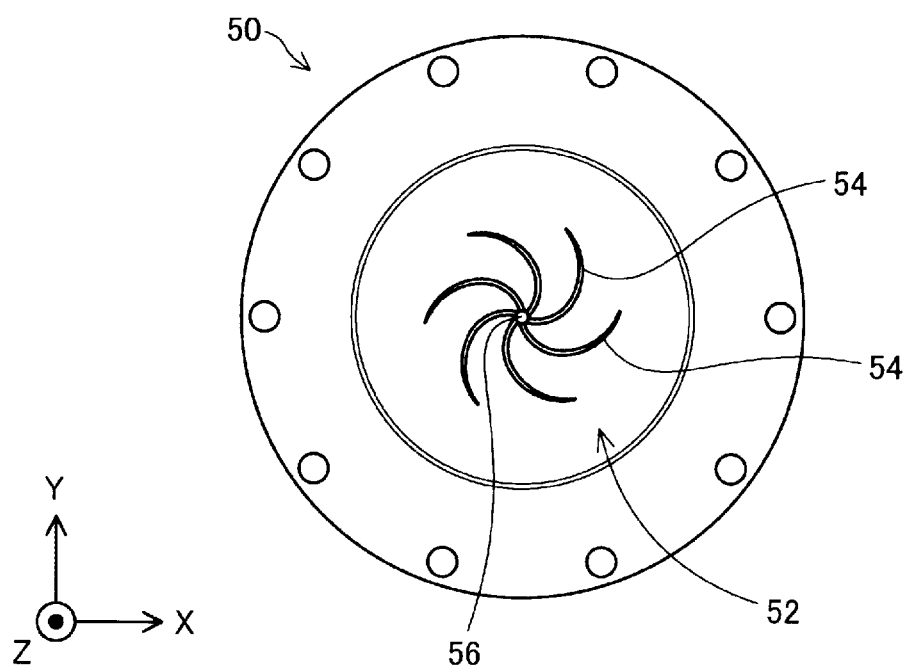
FIG. 8 is a top view showing a configuration of a screw facing surface of a barrel according to the first embodiment.

FIG. 8 is a top view showing a configuration of the screw facing surface 52 of the barrel 50 according to the present embodiment. As described above, the communication hole 56 communicating with the supply flow path 61 is formed at the center of the screw facing surface 52. A plurality of guide grooves 54 are formed around the communication hole 56 in the screw facing surface 52. One end of respective guide grooves 54 is coupled to the communication hole 56 and extends in a spiral shape from the communication hole 56 toward an outer circumferential side of the screw facing surface 52. Respective guide grooves 54 have a function of guiding the shaping material to the communication hole 56.

According to the configuration of the three-dimensional shaping apparatus 100 described above, the material reserved in the material supply portion 20 is supplied from the side surface 43 of the rotating flat screw 40 to the material introduction portion 48 through the supply path 22. The material supplied into the material introduction portion 48 is transported into the spiral portion 47 by rotation of the flat screw 40.

The material transported into the spiral portion 47 is melted at least partially by the rotation of the flat screw 40 and heating by the heater 58 embedded in the barrel 50 to become a paste-like shaping material having fluidity.

By the rotation of the flat screw 40, the shaping material is transported in the spiral portion 47 toward the center portion 46. The shaping material transported to the center portion 46 is sent out from the communication hole 56 to the supply flow path 61. In the first state, the shaping material is supplied from the supply flow path 61 to the first nozzle 65 via the first branch flow path 63. The shaping material supplied to the first nozzle 65 is discharged from the first nozzle hole 67 toward the shaping table 300. On the other hand, in the second state, the shaping material is supplied from the supply flow path 61 to the second nozzle 66 via the second branch flow path 64. The shaping material supplied to the second nozzle 66 is discharged from the second nozzle hole 68 toward the shaping table 300.

Figure 9:
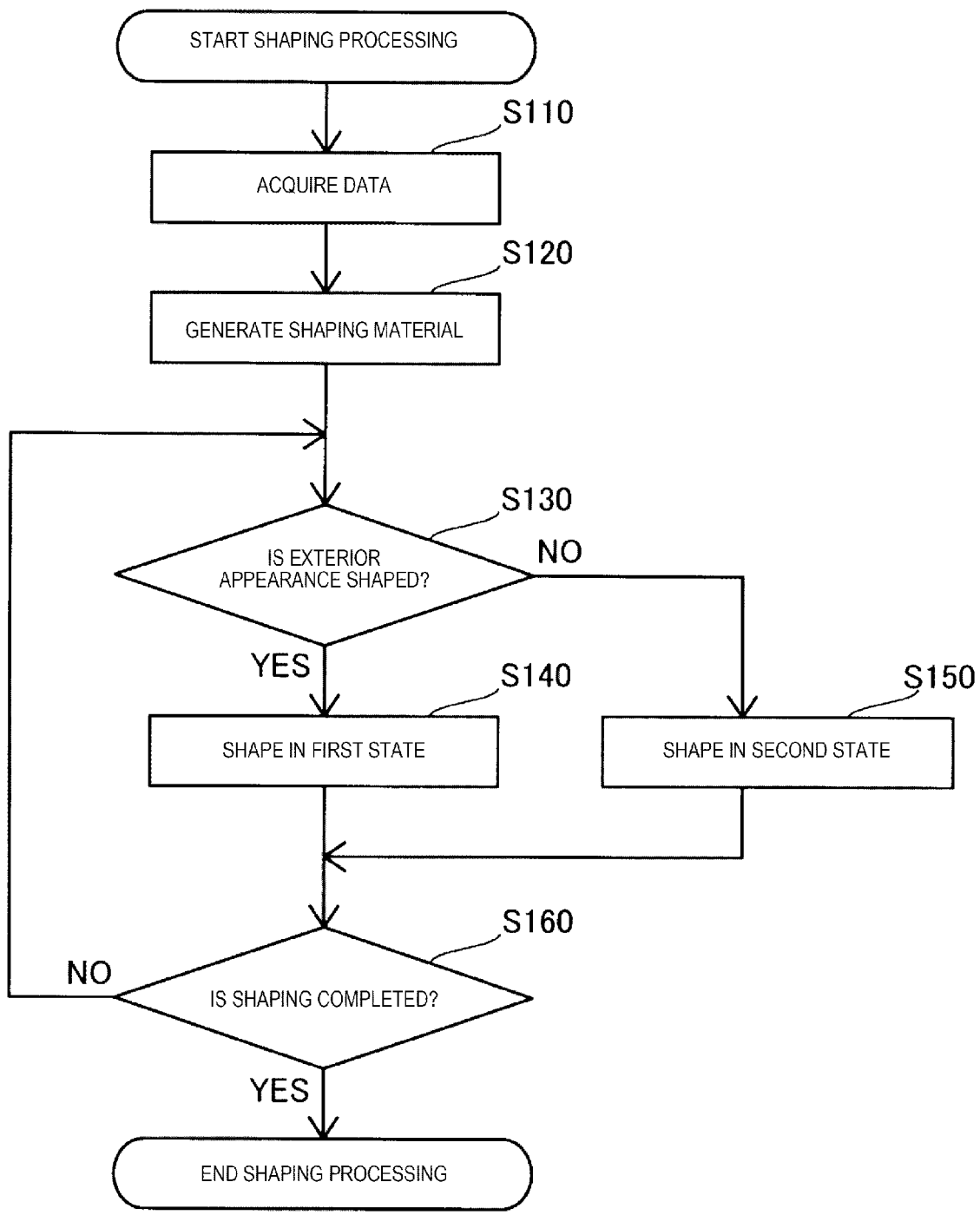
FIG. 9 is a flowchart showing content of shaping processing of the first embodiment.

FIG. 9 is a flowchart showing content of shaping processing for shaping the three-dimensional shaping object OB according to the present embodiment. The processing is performed when a predetermined start operation is performed by a user on an operation panel provided in the three-dimensional shaping apparatus 100 or a computer coupled to the three-dimensional shaping apparatus 100.

First, at a step 110, the control portion 500 acquires shaping path data from a computer or recording medium coupled to the three-dimensional shaping apparatus 100. The shaping path data is data in which a shaping path is represented, the shaping path being a scanning track of the first nozzle 65 or the second nozzle 66 which moves with respect to the shaping table 300 while discharging the shaping material. Shape data of the three-dimensional shaping object OB represented in the STL format or AMF format is converted into the shaping path data by Slicer.

Next, in a step S120, the control portion 500 melts the material to generate the shaping material by controlling the rotation of the flat screw 40 and the heating of the heater 58 embedded in the barrel 50. The shaping material continues to be generated while the three-dimensional shaping object OB is being shaped.

In a step S130, the control portion 500 determines whether or not a portion of the three-dimensional shaping object OB to be shaped is an exterior appearance. The exterior appearance means a portion which is visible from the outside in a completed shape of the three-dimensional shaping object OB. The portion of the three-dimensional shaping object OB other than the exterior appearance is called an interior appearance. For example, the control portion 500 can determine whether or not the portion of the three-dimensional shaping object OB to be shaped is the exterior appearance by using the shaping path data acquired in the step S110. Since the exterior appearance requires higher quality in dimensional precision and surface roughness than the interior appearance, it is preferable that the exterior appearance is densely shaped by discharging the shaping material from the first nozzle 65 with a small diameter. On the other hand, since the interior appearance does not require higher quality in the dimensional precision and the surface roughness than the exterior appearance, it is preferable that the interior appearance is shaped in a short time by discharging the shaping material from the second nozzle 66 with a large diameter.

When it is determined that the portion of the three-dimensional shaping object OB to be shaped in the step S130 is the exterior appearance, the control portion 500 switches to the first state by controlling the valve mechanism 70 in a step S140, and as will be described later with reference to FIG. 11, further controls the tilting mechanism 250 so that the shaping material from the first nozzle 65 is discharged to shape the three-dimensional shaping object OB in a state in which the discharge unit 200 is tilted with respect to the shaping table 300 such that the first nozzle 65 is close to the shaping table 300 and the second nozzle 66 is separated from the shaping table 300.

On the other hand, when it is not determined that the portion of the three-dimensional shaping object OB to be shaped in the step S130 is the exterior appearance, the control portion 500 switches to the second state by controlling the valve mechanism 70 in a step S150, and as will be described later with reference to FIG. 12, further controls the tilting mechanism 250 so that the shaping material from the second nozzle 66 is discharged to shape the three-dimensional shaping object OB in a state in which the discharge unit 200 is tilted with respect to the shaping table 300 such that the first nozzle 65 is separated from the shaping table 300 and the second nozzle 66 is close to the shaping table 300.

That is, the control portion 500 switches to the first state or the second state according to a portion of the three-dimensional shaping object OB to be shaped. The flow rate of the discharged shaping material may be adjusted according to movement speeds of the first nozzle 65 and the second nozzle 66. For example, thickness of the shaping material to be stacked can be made uniform by controlling the valve mechanism 70 to increase the flow rate of the shaping material for a straight part of the shaping path and to decrease the flow rate of the shaping material for a bent part of the shaping path.

After the step S140 or the step S150, the control portion 500 determines whether or not the shaping of the three-dimensional shaping object OB is completed in a step S160. For example, the control portion 500 can determine whether or not the shaping of the three-dimensional shaping object OB is completed by using the shaping path data acquired in the step S110. If it is not determined in the step S160 that the shaping of the three-dimensional shaping object OB is completed, the control portion 500 returns to processing of the step S130 and continues the shaping of the three-dimensional shaping object OB. For example, the control portion 500 performs the shaping of the interior appearance of a first layer after performing the shaping of the exterior appearance of a first layer of the three-dimensional shaping object OB. The control portion 500 forms the first layer of the three-dimensional shaping object OB, and then forms a second layer on the first layer. The control portion 500 may shape the interior appearance over multiple layers after shaping the external appearance over multiple layers. In this manner, the control portion 500 shapes the three-dimensional shaping object OB by stacking the shaping material. On the other hand, if it is determined in the step S160 that the shaping of the three-dimensional shaping object OB is completed, the control portion 500 ends the processing.

Figure 10:
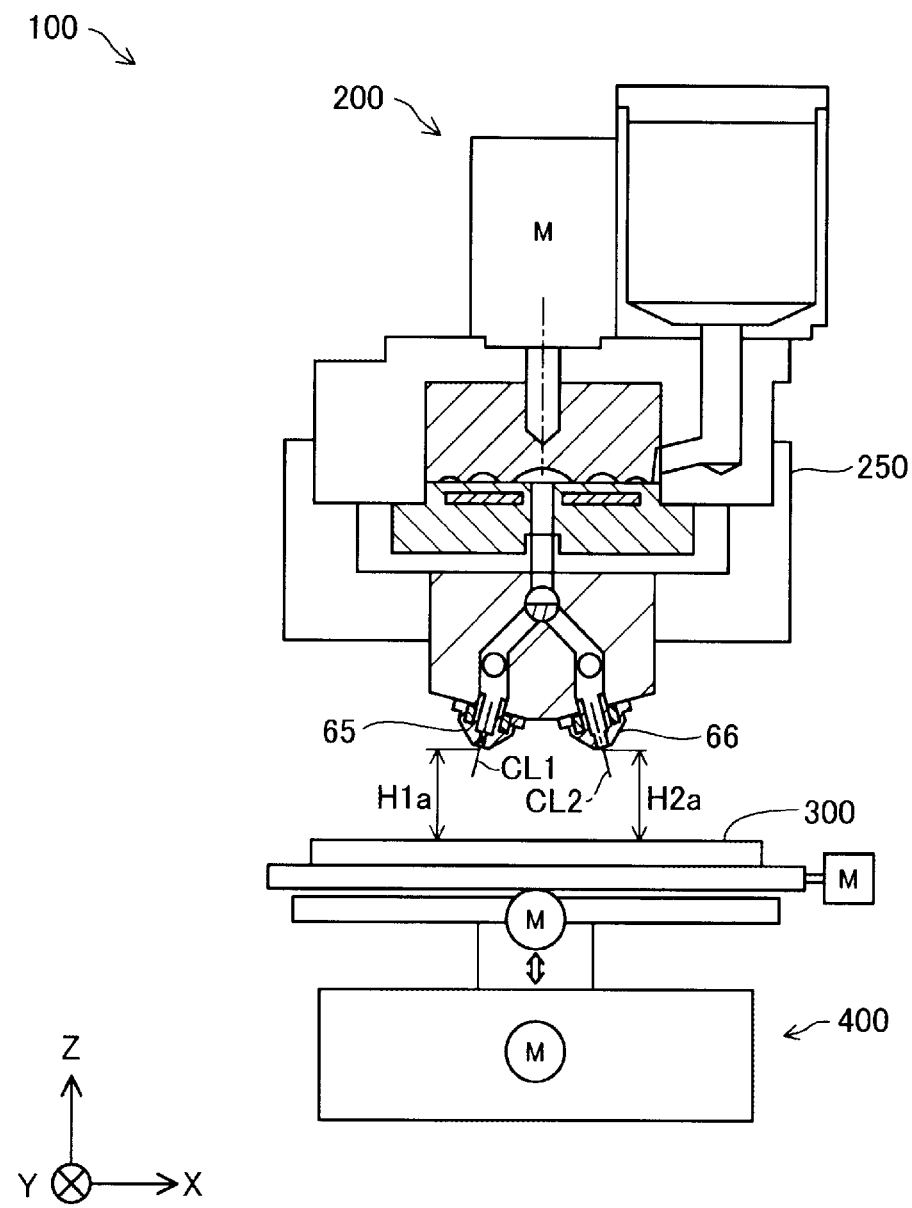
FIG. 10 is an explanatory view showing distances between each of nozzles and a shaping table at an initial position.

FIG. 10 is an explanatory view showing distances between each of the nozzles 65 and 66 and the shaping table 300 at an initial position. The initial position means a rotation position of the discharge unit 200 in which the discharge unit 200 is not tilted with respect to the shaping table 300. At the initial position, the central axis CL1 of the first nozzle 65 and the central axis CL2 of the second nozzle 66 are tilted with respect to the shaping table 300. The initial position is set such that a tilting angle of the central axis CL1 of the first nozzle 65 with respect to the shaping table 300 and a tilting angle of the central axis CL2 of the second nozzle 66 with respect to the shaping table 300 are the same. At the initial position, a distance H1$a$ between the first nozzle 65 and the shaping table 300 and a distance H2$a$ between the second nozzle 66 and the shaping table 300 are the same. At the initial position, the discharge unit 200 is set in the third state in which the shaping material is not discharged from the first nozzle 65 and the shaping material is not discharged from the second nozzle 66.

Figure 11:
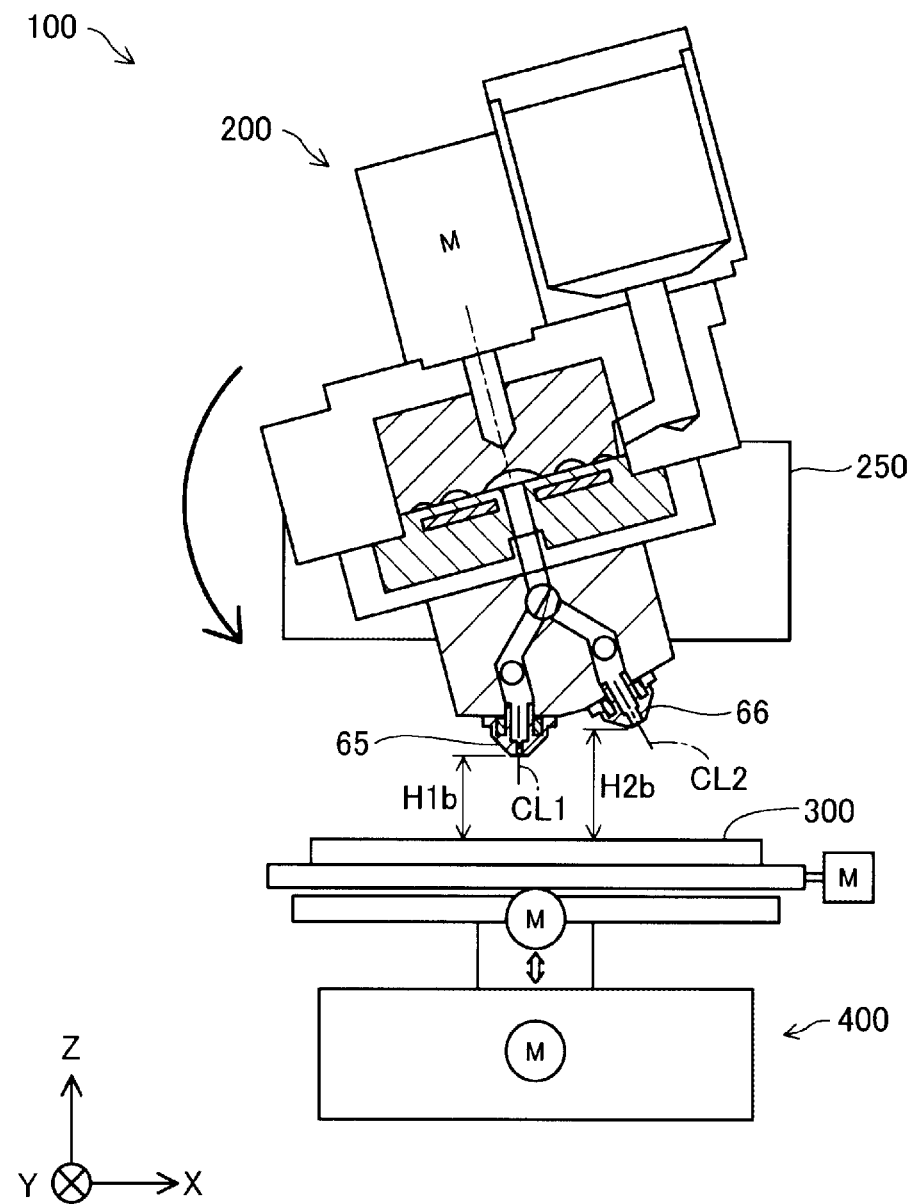
FIG. 11 is an explanatory view showing the distances between each of the nozzles and the shaping table in the first state.

FIG. 11 is an explanatory view showing distances between each of the nozzles 65 and 66 and the shaping table 300 in the first state. When the state is switched to the first state in the step S140 of FIG. 9, the control portion 500 drives the tilting mechanism 250 to tilt the discharge unit 200 with respect to the shaping table 300 so that the first nozzle 65 is closer to the shaping table 300 compared to the initial position and the second nozzle 66 is separated from the shaping table 300 compared to the initial position. In the present embodiment, the control portion 500 tilts the discharge unit 200 with respect to the shaping table 300 so that the central axis CL1 of the first nozzle 65 is perpendicular to the shaping table 300 in the first state. Therefore, in the first state, the distance H1$b$ between the first nozzle 65 and the shaping table 300 is smaller than the distance H2$b$ between the second nozzle 66 and the shaping table 300.

Figure 12:
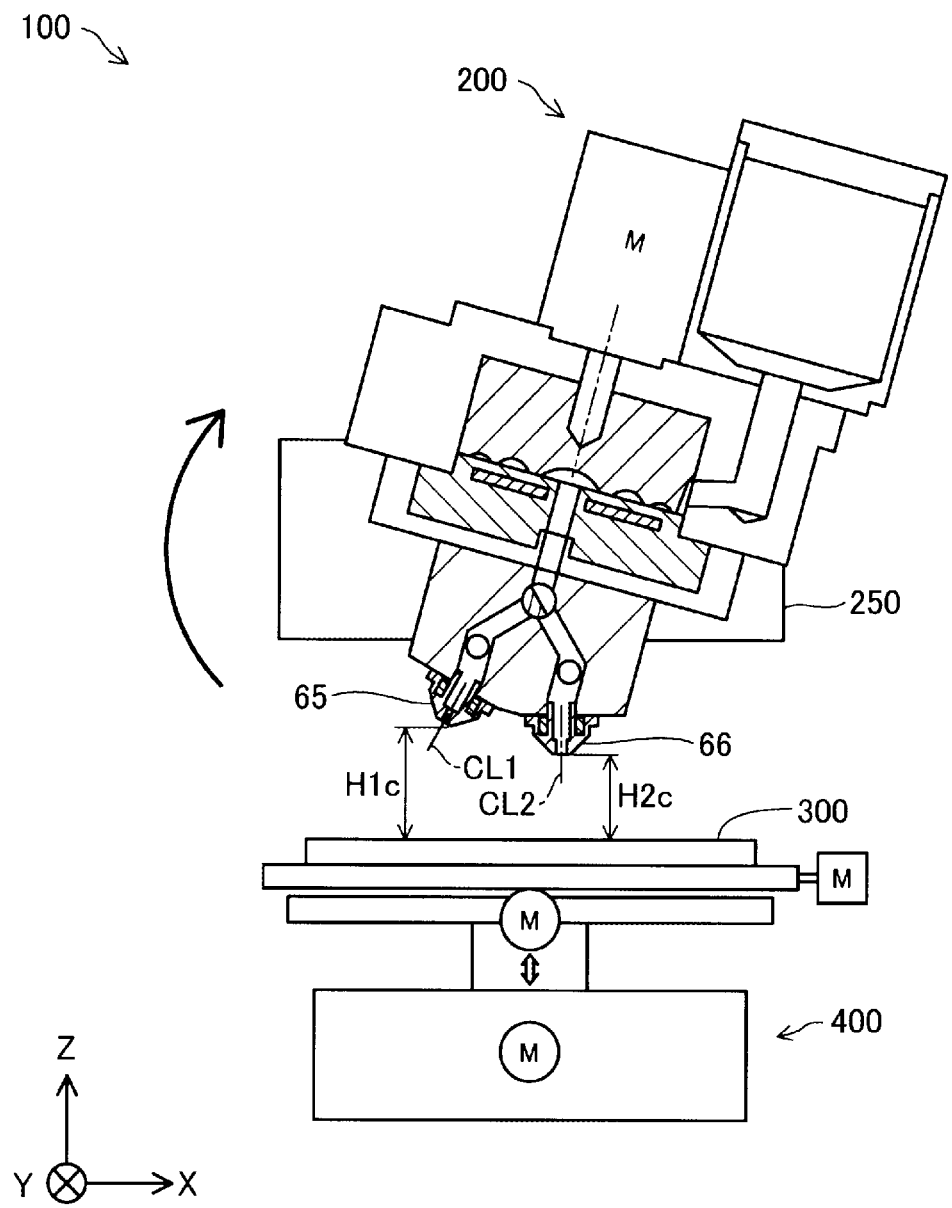
FIG. 12 is an explanatory view showing the distances between each of the nozzles and the shaping table in the second state.

FIG. 12 is an explanatory view showing distances between each of the nozzles 65 and 66 and the shaping table 300 in the second state. When the state is switched to the second state in the step S150 of FIG. 9, the control portion 500 drives the tilting mechanism 250 to tilt the discharge unit 200 with respect to the shaping table 300 so that the first nozzle 65 is separated from shaping table 300 compared to the initial position and the second nozzle 66 is closer to the shaping table 300 compared to the initial position. In the present embodiment, the control portion 500 tilts the discharge unit 200 with respect to the shaping table 300 so that the central axis CL2 of the second nozzle 66 is perpendicular to the shaping table 300 in the second state. Therefore, in the second state, the distance H1$c$ between the first nozzle 65 and the shaping table 300 is bigger than the distance H2$c$ between the second nozzle 66 and the shaping table 300.

According to the three-dimensional shaping apparatus 100 of the present embodiment described above, the control portion 500 drives the tilting mechanism 250 to tilt the discharge unit 200 with respect to the shaping table 300 so that in the first state, the first nozzle 65 to discharge the shaping material is brought close to the shaping table 300, and the second nozzle 66 to stop discharging the shaping material is separated from the shaping table 300. Therefore, it is possible to suppress interference of the second nozzle 66, which stops discharging the shaping material, with the three-dimensional shaping object OB when the shaping material from the first nozzle 65 is discharged to shape the three-dimensional shaping object OB. Further, in the second state, the second nozzle 66 which discharges the shaping material is brought close to the shaping table 300, and the first nozzle 65 which stops discharging the shaping material is separated from the shaping table 300. Therefore, it is possible to suppress interference of the first nozzle 65, which stops discharging the shaping material, with the three-dimensional shaping object OB when the shaping material from the second nozzle 66 is discharged to shape the three-dimensional shaping object OB.

In the present embodiment, since the nozzle diameter Dn2 of the second nozzle is larger than the nozzle diameter Dn1 of the first nozzle, when a portion of the three-dimensional shaping object OB in which the shaping precision is required is shaped, the shaping can be performed using the first nozzle 65 having the small diameter, and when a portion of the three-dimensional shaping object OB in which the shaping speed is required is shaped, the shaping can be performed using the second nozzle 66 having the large diameter. Therefore, since the first nozzle 65 and the second nozzle 66 having different nozzle diameters can be used properly according to application, it is possible to achieve both improvement in the shaping precision and improvement in the shaping speed.

Further, in the present embodiment, the control portion 500 performs control such that when the exterior appearance of the three-dimensional shaping object OB which requires the shaping precision is shaped, the shaping is performed using the first nozzle 65 with the small diameter, and when the interior appearance of the three-dimensional shaping object OB which requires the shaping speed rather than the shaping precision is shaped, the shaping is performed using the second nozzle 66 having the large diameter. Therefore, both improvement in the shaping precision and improvement in the shaping speed can be achieved.

Further, in the present embodiment, when the discharge of the shaping material from the first nozzle 65 is stopped, the discharge of the shaping material from the first nozzle 65 which stops discharging the shaping material can be suppressed since the shaping material in the first branch flow path 63 can be sucked by the first suction portion 80. Further, when the discharge of the shaping material from the second nozzle 66 is stopped, the leakage of the shaping material from the second nozzle 66 which stops discharging the shaping material can be suppressed since the shaping material in the second branch flow path 64 can be sucked by the second suction portion 85. Therefore, it is possible to suppress leakage of the shaping material from a nozzle which stops discharging the shaping material, that is, from the first nozzle 65 and the second nozzle 66.

Further, in the present embodiment, since the shaping material is generated using the small flat screw 40, the melting portion 30 can be reduced in size. Therefore, the three-dimensional shaping apparatus 100 can be reduced in size.

In the present embodiment, a pellet-like ABS resin material is used, but as the material used in the discharge unit 200, for example, various materials such as a material having thermoplasticity, a metal material, and a ceramic material may be also adopted as a main material which shapes the three-dimensional shaping object. Here, the "main material" means a central material which forms a shape of the three-dimensional shaping object, and means a material which accounts for a content of 50% by weight or more in the three-dimensional shaping object. The shaping material described above includes one in which the main material is melted alone, and one in which a part of the components contained together with the main material is melted and made into a paste shape.

When a material having thermoplasticity is used as the main material, the shaping material is generated in the melting portion 30 by the material being plasticized. A "plasticization" means that heat is applied to the material having thermoplasticity to melt the material.

As the material having thermoplasticity, for example, a thermoplastic resin material of any one of the following or a combination of two or more thereof can be used.
Examples of Thermoplastic Resin Materials General purpose engineering plastics such as polypropylene resin (PP), polyethylene resin (PE), polyacetal resin (POM), polyvinyl chloride resin (PVC), polyamide resin (PA), acrylonitrile butadiene styrene resin (ABS), polylactic acid resin (PLA), polyphenylene sulfide resin (PPS), polyetheretherketone (PEEK), polycarbonate (PC), modified polyphenylene ether, polybutylene terephthalate, and polyethylene terephthalate, or engineering plastics such as polysulfone, polyether sulfone, polyphenylene sulfide, polyarylate, polyimide, polyamide imide, polyether imide, and polyether ether ketone In the material having thermoplasticity, additives such as a wax, a flame retardant, an antioxidant, and a heat stabilizer may be mixed with a pigment, a metal, a ceramic, or the like. The material having thermoplasticity is plasticized and converted to a melted state in the melting portion 30 by the rotation of the flat screw 40 and the heating of the heater 58. Further, the shaping material generated by such a method above is discharged from the first nozzle hole 67 or the second nozzle hole 68 and then cured by a decrease in temperature.

It is desirable that the material having thermoplasticity is ejected from the first nozzle hole 67 and the second nozzle hole 68 in a completely melted state by being heated to a temperature higher than or equal to a glass transition point thereof. For example, it is desirable that the ABS resin has a glass transition point of about 120° C. and is at about 200° C. when ejected from the first nozzle hole 67 and the second nozzle hole 68. A heater may be provided around the first nozzle hole 67 and the second nozzle hole 68 in order to eject the shaping material in such a high temperature state.

In the discharge unit 200, for example, the following metal material may be used as the main material instead of the material having thermoplasticity described above. In this case, it is desirable that components to be melted during the generation of the shaping material is mixed with the powder material made of the following metal material and the mixture is introduced into the melting portion 30.
Examples of Metal Materials A single metal of magnesium (Mg), iron (Fe), cobalt (Co), chromium (Cr), aluminum (Al), titanium (Ti), copper (Cu), and nickel (Ni), or an alloy containing one or more of these metals
Examples of the Alloys Maraging steel, stainless steel, cobalt chromium molybdenum, titanium alloy, nickel alloy, aluminum alloy, cobalt alloy, and cobalt chromium alloy In the discharge unit 200, it is possible to use a ceramic material as the main material instead of the metal material described above. As the ceramic material, for example, oxide ceramics such as silicon dioxide, titanium dioxide, aluminum oxide and zirconium oxide, and non-oxide ceramics such as aluminum nitride can be used. When the metal material or the ceramic material as described above is used as the main material, the shaping material disposed in the shaping table 300 may be cured via, for example, sintering by irradiation of a laser, hot air, or the like.

The powder material of the metal material or the ceramic material introduced to the material supply portion 20 may be a single metal powder and an alloy powder, or a mixed material produced by mixing a plurality of types of ceramic material powders. Further, the powder material of the metal material or the ceramic material may be coated with, for example, a thermoplastic resin as exemplified above, or other thermoplastic resins. In this case, the thermoplastic resin may be melted to develop fluidity in the melting portion 30.

For example, the following solvent may be added to the powder material of the metal material or the ceramic material which are introduced to the material supply portion 20. The solvent can be used by combining 1 type, or 2 or more types selected from the following.
Examples of Solvent Water, (poly) alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene and xylene, ketones such as methyl ethyl ketone, acetone, methyl isobutyl ketone, ethyl n-butyl ketone, diisopropyl ketone and acetylacetone, alcohols such as ethanol, propanol and butanol, tetraalkyl ammonium acetates, sulfoxide solvents such as dimethyl sulfoxide and diethyl sulfoxide, pyridine solvents such as pyridine, γ-picoline and 2,6-lutidine, and ionic liquids such as tetraalkyl ammonium acetate (for example, tetrabutyl ammonium acetate or the like) and butyl carbitol acetate In addition, for example, the following binder may be added to the powder material of the metal material or the ceramic material introduced into the material supply portion 20.

Examples of Binders

Figure 13:
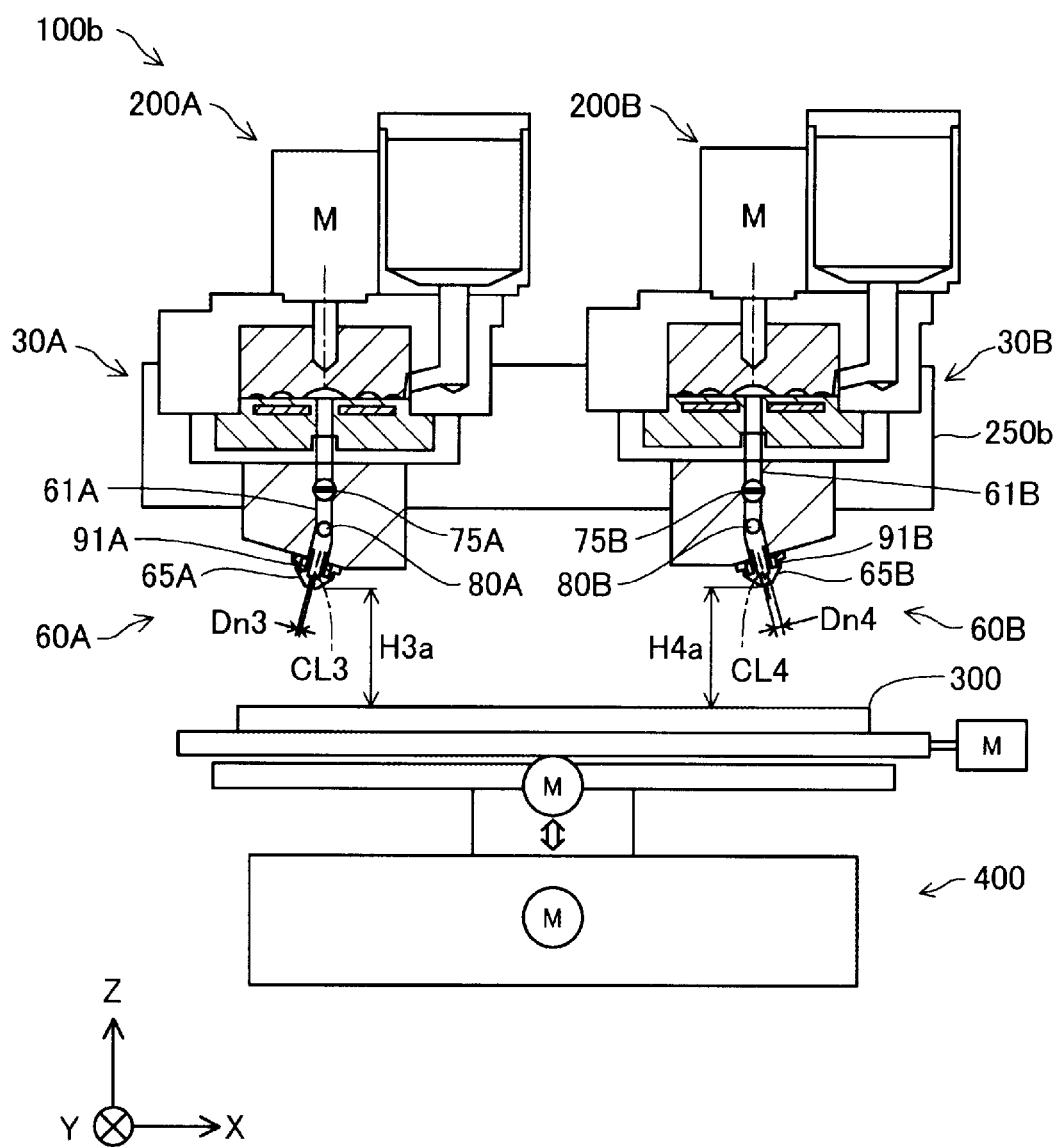
FIG. 13 is an explanatory view showing a schematic configuration of a three-dimensional shaping apparatus according to a second embodiment.

Acrylic resin, epoxy resin, silicone resin, cellulose resin or other synthetic resin, or PLA (polylactic acid), PA (polyamide), PPS (polyphenylene sulfide), PEEK (polyether ether ketone) or other thermoplastic resin B. Second Embodiment FIG. 13 is an explanatory view showing a schematic configuration of a three-dimensional shaping apparatus 100*b* according to a second embodiment. The three-dimensional shaping apparatus 100*b* of the second embodiment is different from the first embodiment in that the three-dimensional shaping apparatus 100*b* includes a first discharge unit 200A and a second discharge unit 200B. Configurations of the first discharge unit 200A and the second discharge unit 200B are different from that of the discharge unit 200 of the first embodiment. Other configurations are the same as those of the first embodiment shown in FIG. 1 unless otherwise described.

The first discharge unit 200A in the present embodiment has a discharge portion 60A whose configuration is different from that of the discharge portion 60 of the first embodiment. The discharge portion 60A in the present embodiment is provided with a supply flow path 61A, a nozzle 65A, a flow rate adjustment mechanism 75A, a suction portion 80A, and a nozzle heater 91A. The nozzle 65A communicates with the supply flow path 61A. The shaping material generated in a melting portion 30A is supplied to the nozzle 65A via the supply flow path 61A. The supply flow path 61A is provided with a flow rate adjustment mechanism 75A and the suction portion 80A from upstream. The flow rate adjustment mechanism 75A adjusts a flow rate of the shaping material supplied to the nozzle 65A by changing flow path resistance of the supply flow path 61A. The flow rate adjustment mechanism 75A can switch a start and stop of discharging the shaping material from the nozzle 65A. In the present embodiment, the flow rate adjustment mechanism 75A is constituted with a butterfly valve. The flow rate adjustment mechanism 75A is driven under the control of the control portion 500. A configuration of the suction portion 80A is the same as that of the first suction portion 80 of the first embodiment. A configuration of the nozzle heater 91A is the same as that of the first nozzle heater 91 of the first embodiment. The discharge portion 60A in the present embodiment is not provided with the second nozzle 66, the connection portion 62, the first branch flow path 63, the second branch flow path 64, the valve mechanism 70, and the second suction portion 85, in the discharge portion 60 of the first embodiment.

The second discharge unit 200B in the present embodiment has a discharge portion 60B whose configuration is different from that of the discharge portion 60 of the first embodiment. The discharge portion 60B in the present embodiment is provided with a supply flow path 61B, a nozzle 65B, a flow rate adjustment mechanism 75B, a suction portion 80B, and a nozzle heater 91B. The nozzle 65B communicates with the supply flow path 61B. The shaping material generated in a melting portion 30B is supplied to the nozzle 65B via the supply flow path 61B. The supply flow path 61B is provided with the flow rate adjustment mechanism 75B and the suction portion 80B from upstream. The flow rate adjustment mechanism 75B adjusts a flow rate of the shaping material supplied to the nozzle 65B by changing flow path resistance of the supply flow path 61B. The flow rate adjustment mechanism 75B can switch a start and stop of discharging of the shaping material from the nozzle 65B. In the present embodiment, the flow rate adjustment mechanism 75B is constituted with the butterfly valve. The flow rate adjustment mechanism 75B is driven under the control of the control portion 500. A configuration of the suction portion 80B is the same as that of the first suction portion 80 of the first embodiment. A configuration of the nozzle heater 91B is the same as that of the first nozzle heater 91 of the first embodiment. The discharge portion 60B in the present embodiment is not provided with the second nozzle 66, the connection portion 62, the first branch flow path 63, the second branch flow path 64, the valve mechanism 70, and the second suction portion 85, in the discharge portion 60 of the first embodiment.

In the present embodiment, a nozzle diameter Dn4 of the nozzle 65B is larger than a nozzle diameter Dn3 of the nozzle 65A. The first discharge unit 200A and the second discharge unit 200B discharge the shaping material forming the three-dimensional shaping object OB from the nozzles 65A and 65B, respectively. The nozzle diameter Dn3 of the nozzle 65A and the nozzle diameter Dn4 of the nozzle 65B may be the same. In this case, for example, the first discharge unit 200A may discharge the shaping material forming the three-dimensional shaping object OB from the nozzle 65A, and the second discharge unit 200B may discharge a support material used for shaping the three-dimensional shaping object OB from the nozzle 65B. The support material is a member for maintaining the shape of the three-dimensional shaping object being shaped, and means a member which is removed after the shaping is completed.

A tilting mechanism 250*b* in the present embodiment tilts each of the first discharge unit 200A and the second discharge unit 200B with respect to the shaping table 300 independently of each other. In the present embodiment, the tilting mechanism 250*b* supports the first discharge unit 200A and the second discharge unit 200B. The tilting mechanism 250*b* rotates the first discharge unit 200A about the axis parallel to the Y axis, thereby tilting the first discharge unit 200A with respect to the shaping table 300, and rotates the second discharge unit 200B about the axis parallel to the Y axis, thereby tilting the second discharge unit 200B with respect to the shaping table 300. The tilting mechanism 250*b* rotates each of the first discharge unit 200A and the second discharge unit 200B independently of each other by drive force of a motor. Each motor is driven under the control of the control portion 500.

As shown in FIG. 13, in the present embodiment, the first discharge unit 200A is set to an initial position, and the second discharge unit 200B is set to an initial position, and the nozzle 65A of the first discharge unit 200A and the nozzle 65B of the second discharge unit 200B are disposed in a direction away from each other as the nozzle 65A and the nozzle 65B face toward the shaping table 300. At the initial position of the first discharge unit 200A, a central axis CL3 of the nozzle 65A is tilted with respect to the shaping table 300. At the initial position of the second discharge unit 200B, a central axis CL4 of the nozzle 65B is tilted with respect to the shaping table 300. The respective initial positions are set such that a tilting angle of the central axis CL3 of the nozzle 65A with respect to the shaping table 300 at the initial position of the first discharge unit 200A and a tilting angle of the central axis CL4 of the nozzle 65B with respect to the shaping table 300 at the initial position of the second discharge unit 200B are the same. A distance H3a between the nozzle 65A and the shaping table 300 at the initial position of the first discharge unit 200A is the same as a distance H4a between the nozzle 65B and the shaping table 300 at the initial position of the second discharge unit 200B.

Figure 14:
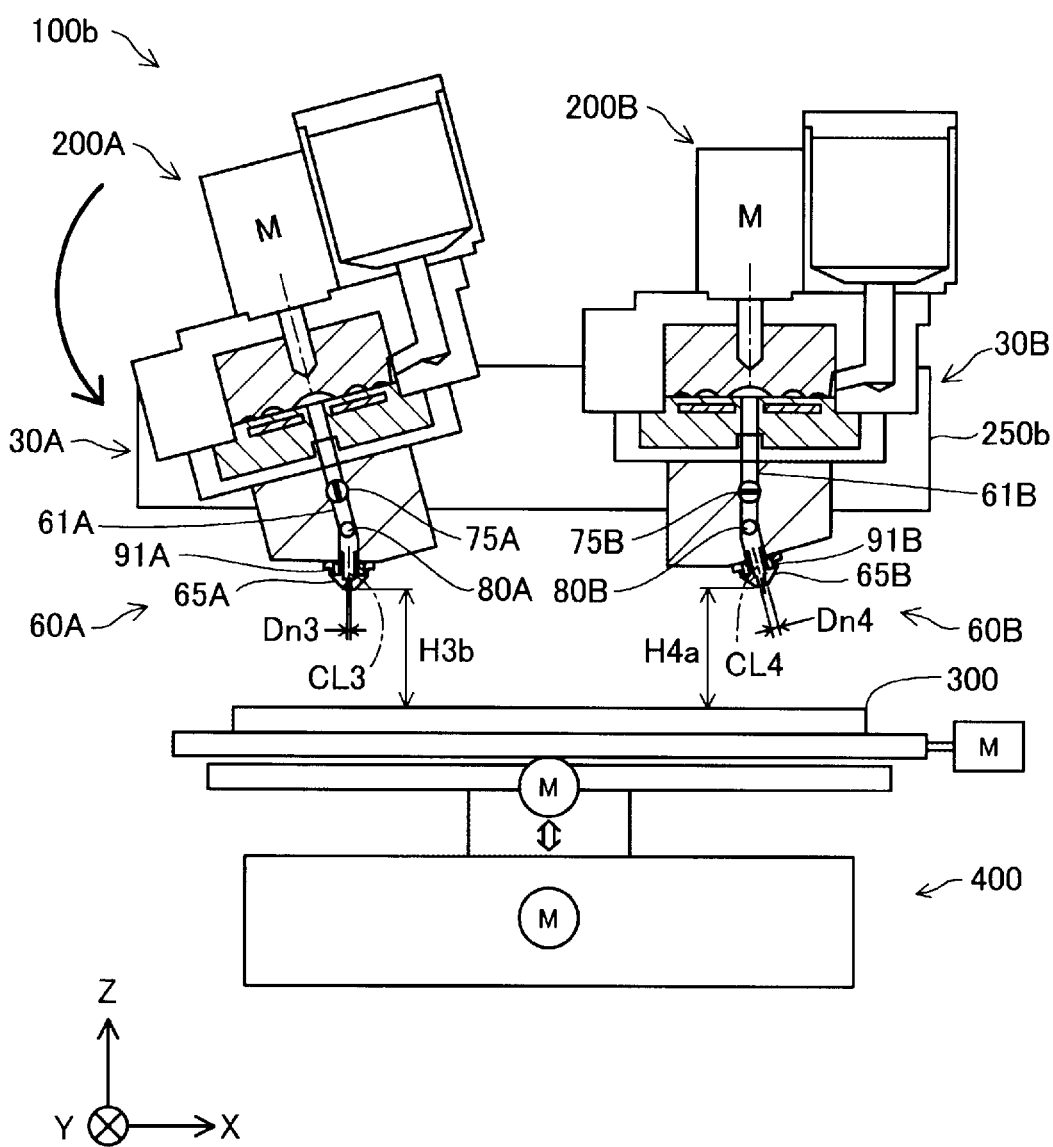
FIG. 14 is an explanatory view showing an example of the distances between each of nozzles and the shaping table according to the second embodiment.

FIG. 14 is an explanatory view showing an example of distances between each of the nozzles 65A and 65B and the shaping table 300 in the present embodiment. For example, when the shaping material is discharged from the nozzle 65A of the first discharge unit 200A, the control portion 500 tilts the first discharge unit 200A with respect to the shaping table 300 by driving the tilting mechanism 250b. Therefore, the nozzle 65A of the first discharge unit 200A is closer to the shaping table 300 compared to the initial position. In the present embodiment, the control portion 500 tilts the first discharge unit 200A with respect to the shaping table 300 so that the central axis CL3 of the nozzle 65A is perpendicular to the shaping table 300. In the state, the distance H3b between the nozzle 65A and the shaping table 300 is smaller than the distance H4a between the nozzle 65B and the shaping table 300.

Although illustration is omitted, when the discharge of the shaping material from the nozzle 65A of the first discharge unit 200A is stopped and the discharge of the shaping material from the nozzle 65B of the second discharge unit 200B is started, the control portion 500 drives the tilting mechanism 250b so that the first discharge unit 200A is returned to the initial position and the second discharge unit 200B is tilted with respect to the shaping table 300. Therefore, the nozzle 65A of the first discharge unit 200A is separated from the shaping table 300, and the nozzle 65B of the second discharge unit 200B is brought close to the shaping table 300. In the present embodiment, the control portion 500 tilts the second discharge unit 200B with respect to the shaping table 300 so that the central axis CL4 of the nozzle 65B is perpendicular to the shaping table 300.

According to the three-dimensional shaping apparatus 100b of the present embodiment described above, the control portion 500 drives the tilting mechanism 250b to tilt the first discharge unit 200A or the second discharge unit 200B with respect to the shaping table 300 so that between the nozzle 65A of the first discharge unit 200A and the nozzle 65B of the second discharge unit 200B, a nozzle which discharges the shaping material is brought close to the shaping table 300 and a nozzle which stops the discharge of the shaping material is separated from the shaping table 300. Therefore, when the shaping material is discharged from one of the nozzle 65A of the first discharge unit 200A and the nozzle 65B of the second discharge unit 200B to shape the three-dimensional shaping object OB, it is possible to suppress the other nozzle, which stops discharging the shaping material, from interfering with the three-dimensional shaping object OB.

C. Third Embodiment

Figure 15:
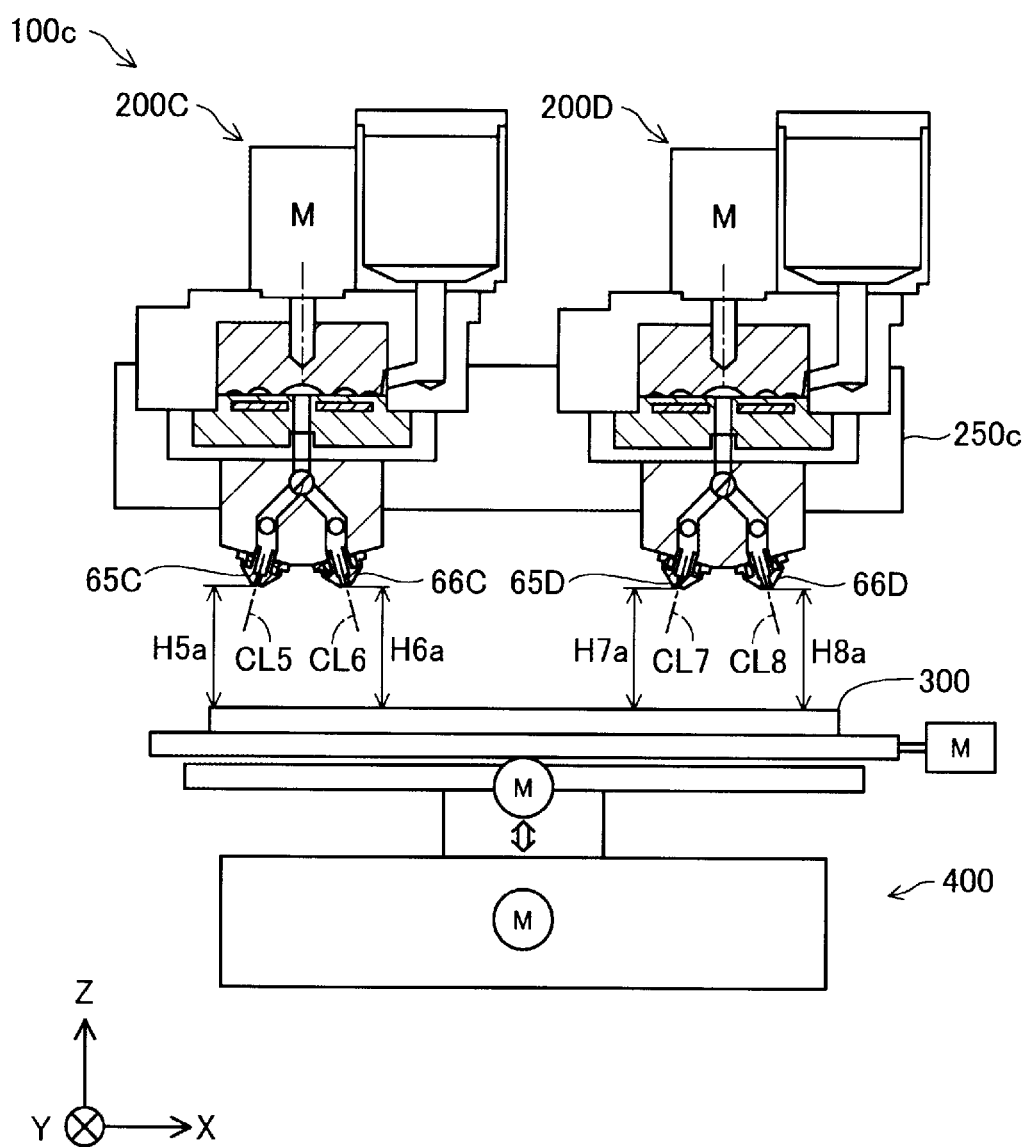
FIG. 15 is an explanatory view showing a schematic configuration of a three-dimensional shaping apparatus according to a third embodiment.

FIG. 15 is an explanatory view showing a schematic configuration of a three-dimensional shaping apparatus 100c according to a third embodiment. The three-dimensional shaping apparatus 100c of the third embodiment is different from the first embodiment in that the three-dimensional shaping apparatus 100c includes a first discharge unit 200C and a second discharge unit 200D. Other configurations are the same as those of the first embodiment shown in FIG. 1 unless otherwise described.

Configurations of the first discharge unit 200C and the second discharge unit 200D are the same as the discharge unit 200 of the first embodiment. Therefore, the first discharge unit 200C includes a first nozzle 65C and a second nozzle 66C. In the first discharge unit 200C, a central axis CL5 of the first nozzle 65C and a central axis CL6 of the second nozzle 66C are disposed in a direction away from each other as going toward the shaping table 300. The second discharge unit 200D includes a first nozzle 65D and a second nozzle 66D. In the second discharge unit 200D, a central axis CL7 of the first nozzle 65D and a central axis CL8 of the second nozzle 66D are disposed in a direction away from each other as going toward the shaping table 300. A nozzle diameter Dn5 of the first nozzle 65C and a nozzle diameter Dn6 of the second nozzle 66C included in the first discharge unit 200C, and the nozzle diameter Dn7 of the first nozzle 65D and the nozzle diameter Dn8 of the second nozzle 66D included in the second discharge unit 200D may be different from each other or may all be the same.

In the present embodiment, the first discharge unit 200C discharges the shaping material forming the three-dimensional shaping object OB from the first nozzle 65C and the second nozzle 66C. The second discharge unit 200D discharges a support material used for shaping the three-dimensional shaping object OB from the first nozzle 65D and the second nozzle 66D. Both the first discharge unit 200C and the second discharge unit 200D may discharge the shaping material forming the three-dimensional shaping object OB from the first nozzles 65C and 65D and the second nozzles 66C and 66D.

A tilting mechanism 250c in the present embodiment tilts the first discharge unit 200C and the second discharge unit 200D with respect to the shaping table 300. In the present embodiment, the tilting mechanism 250c supports the first discharge unit 200C and the second discharge unit 200D. The tilting mechanism 250c tilts the first discharge unit 200C with respect to the shaping table 300 by rotating the first discharge unit 200C about an axis parallel to the Y axis. The tilting mechanism 250c tilts the second discharge unit 200D with respect to the shaping table 300 by rotating the second discharge unit 200D about an axis parallel to the Y axis. The tilting mechanism 250 rotates each of the first discharge unit 200C and the second discharge unit 200D independently of each other by drive force of a motor. Each motor is driven under the control of the control portion 500.

As shown in FIG. 15, a distance H5a between the first nozzle 65C and the shaping table 300 and a distance H6a between the second nozzle 66C and the shaping table 300 at an initial position of the first discharge unit 200C, and a distance H7a between the first nozzle 65D and the shaping table 300 and a distance H8a between the second nozzle 66D and the shaping table 300 at an initial position of the second discharge unit 200D are the same.

Figure 16:
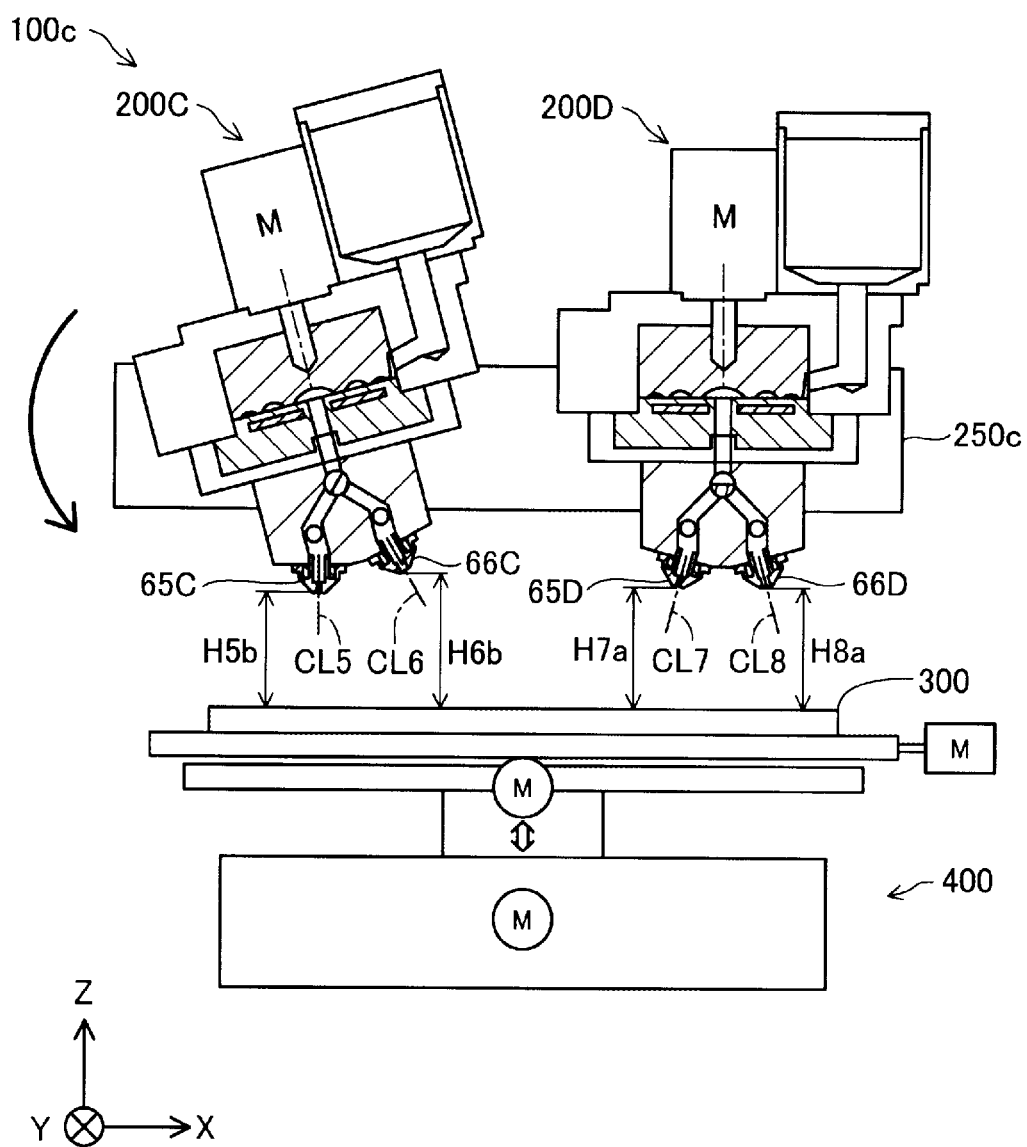
FIG. 16 is an explanatory view illustrating an example of distances between each of nozzles and the shaping table according to the third embodiment.

FIG. 16 is an explanatory view showing an example of the distances between each of the nozzles 65C, 66C, 65D, and 66D and the shaping table 300 in the present embodiment.

FIG. 16 shows a state in which the first discharge unit 200C is tilted and the second discharge unit 200D is set to the initial position. For example, when the shaping material from the first nozzle 65C of the first discharge unit 200C is discharged, at the time of switching the first discharge unit 200C to a first state, the control portion 500 drives the tilting mechanism 250c to tilt the first discharge unit 200C with respect to the shaping table 300 so that the first nozzle 65C of the first discharge unit 200C is closer to the shaping table 300 compared to the initial position and the second nozzle 66C is separated from the shaping table 300 compared to the initial position. The first discharge unit 200C is tilted by the tilting mechanism 250c so that the central axis CL5 of the first nozzle 65C is perpendicular to the shaping table 300. The second discharge unit 200D is maintained at the initial position, and the discharge of the support material from the first nozzle 65D and the second nozzle 66D is stopped. In the state, a distance H5b between the first nozzle 65C of the first discharge unit 200C and the shaping table 300 is smaller than a distance H6b between the second nozzle 66C of the first discharge unit 200C and the shaping table 300, a distance H7a between the first nozzle 65D of the second discharge unit 200D and the shaping table 300, and a distance H8a between the second nozzle 66D of the second discharge unit 200D and the shaping table 300.

Although illustration is omitted, when the shaping material from the second nozzle 66C of the first discharge unit 200C is discharged, at the time of switching the first discharge unit 200C to a second state, the control portion 500 drives the tilting mechanism 250c to tilt the first discharge unit 200C with respect to the shaping table 300 so that the first nozzle 65C of the first discharge unit 200C is separated from the shaping table 300 compared to the initial position and the second nozzle 66C is closer to the shaping table 300 compared to the initial position. The first discharge unit 200C is tilted by the tilting mechanism 250c so that the central axis CL6 of the second nozzle 66C is perpendicular to the shaping table 300. The second discharge unit 200D is maintained at the initial position, and the discharge of the support material from the first nozzle 65D and the second nozzle 66D is stopped.

When the support material from the first nozzle 65D of the second discharge unit 200D is discharged, at the time of switching the second discharge unit 200D to the first state, the control portion 500 drives the tilting mechanism 250c to tilt the second discharge unit 200D with respect to the shaping table 300 so that the first nozzle 65D of the second discharge unit 200D is closer to the shaping table 300 compared to the initial position and the second nozzle 66D is separated from the shaping table 300 compared to the initial position. The second discharge unit 200D is tilted by the tilting mechanism 250c so that the central axis CL7 of the first nozzle 65D is perpendicular to the shaping table 300. At this time, the first discharge unit 200C is maintained at the initial position, and the first discharge unit 200C stops the discharge of the shaping material from the first nozzle 65C and the second nozzle 66C.

When the support material from the second nozzle 66D of the second discharge unit 200D is discharged, at the time of switching the second discharge unit 200D to the second state, the control portion 500 drives the tilting mechanism 250c to tilt the second discharge unit 200D with respect to the shaping table 300 so that the first nozzle 65D of the second discharge unit 200D is separated from the shaping table 300 compared to the initial position and the second nozzle 66D is closer to the shaping table 300 compared to the initial position. The second discharge unit 200D is tilted by the tilting mechanism 250c so that the central axis CL8 of the second nozzle 66D is perpendicular to the shaping table 300. At this time, the first discharge unit 200C is maintained at the initial position, and the first discharge unit 200C stops the discharge of the shaping material from the first nozzle 65C and the second nozzle 66C.

According to the three-dimensional shaping apparatus 100c of the present embodiment described above, the control portion 500 drives the tilting mechanism 250c to tilt one of the first discharge unit 200C and the second discharge unit 200D which includes a nozzle that discharges the shaping material or the support material with respect to the shaping table 300 so that any one nozzle which discharges the shaping material among the first nozzle 65C and second nozzle 66C of the first discharge unit 200C and the first nozzle 65D and second nozzle 66D of the second discharge unit 200D, is brought close to the shaping table 300 and other nozzles which stops the discharge of the shaping material are separated from the shaping table 300. Therefore, when the three-dimensional shaping object OB is shaped by discharging the shaping material from any one nozzle of the first nozzle 65C and second nozzle 66C of the first discharge unit 200C and the first nozzle 65D and second nozzle 66D of the second discharge unit 200D, it is possible to suppress other nozzles which stops the discharge of the shaping material from interfering with the three-dimensional shaping object OB.

D. Other Embodiments (D1) In the three-dimensional shaping apparatus 100 of the first embodiment described above, the nozzle diameter Dn2 of the second nozzle 66 is larger than the nozzle diameter Dn1 of the first nozzle 65. On the other hand, the nozzle diameter Dn1 of the first nozzle 65 and the nozzle diameter Dn2 of the second nozzle 66 may be the same. In this case, for example, when the first nozzle 65 causes a discharge failure of the shaping material during shaping the three-dimensional shaping object OB using the first nozzle 65, it is possible to suppress a decrease in productivity since the second nozzle 66 can be used to continue to shape the three-dimensional shaping object OB by switching from the first state to the second state.

(D2) In the three-dimensional shaping apparatus 100 of the first embodiment described above, a shape of the first nozzle hole 67 of the first nozzle 65 and a shape of the second nozzle hole 68 of the second nozzle 66 are circular. On the other hand, the shape of the first nozzle hole 67 and the shape of the second nozzle hole 68 may be different. For example, the first nozzle hole 67 may be circular and the shape of the second nozzle hole 68 may be square. When the shape of the nozzle hole is square, the length of the square diagonal is the nozzle diameter. For example, when the shape of the first nozzle hole 67 of the first nozzle 65 is circular, the shape of the second nozzle hole 68 of the second nozzle 66 is square, and the nozzle diameter Dn1 of the first nozzle 65 and the nozzle diameter Dn2 of the second nozzle 66 are the same, a density of the shaping material discharged from the second nozzle 66 can be made higher than a density of the shaping material discharged from the first nozzle 65.

(D3) In the three-dimensional shaping apparatus 100, 100b, and 100c of the embodiments described above, the discharge units 200, 200A, 200B, 200C, and 200D may be provided with positioning pins which operate in conjunction with the plungers 82 and 87 of the suction portions 80 and 85, and the tilting mechanisms 250, 250b, and 250c may be provided with positioning holes into which the positioning pins are fitted. The positioning pins are driven by plunger drive portions 83 and 88. When the plungers 82 and 87 move in a direction away from the flow path, the positioning pins in conjunction with the plungers 82 and 87 are engaged with the positioning holes, and the rotation of the discharge units 200, 200A, 200B, 200C, and 200D is fixed. On the other hand, when the plungers 82 and 87 move in a direction approaching the flow path, the positioning pins in conjunction with the plungers 82 and 87 are detached from the positioning holes, and the discharge units 200, 200A, 200B, 200C, and 200D can rotate. In this case, rotational positions of the discharge units 200, 200A, 200B, 200C, and 200D can be prevented from shifting.

E. Other Aspects

The present disclosure is not limited to the embodiments described above, and can be realized with various aspects in the range without departing from the gist thereof. For example, the present disclosure can be also implemented as the following aspects. The technical features in the embodiments described above corresponding to the technical features in each of aspects described below may be replaced or combined as appropriate in order to solve part or all of the problems which the present disclosure includes or to accomplish part of all of the effects which the present disclosure achieves. In addition, unless the technical feature is described as essential in the present disclosure, the technical feature can be deleted as appropriate.

(1) According to a first embodiment of the present disclosure, a three-dimensional shaping apparatus is provided. The three-dimensional shaping apparatus includes a discharge mechanism discharging a shaping material, a table on which the shaping material discharged from the discharge mechanism is stacked, a tilting mechanism tilting the discharge mechanism with respect to the table, and a control portion controlling the discharge mechanism and the tilting mechanism. The discharge mechanism includes a melting portion melting a material to be used as the shaping material, a supply flow path through which the shaping material supplied from the melting portion flows, a first branch flow path and a second branch flow path to which the shaping material is supplied from the supply flow path, a coupling portion coupling the supply flow path with the first branch flow path and the second branch flow path, a first nozzle communicating with the first branch flow path and a second nozzle communicating with the second branch flow path, and a valve mechanism provided in the connection portion, the first nozzle and the second nozzle are disposed in a direction in which a central axis of the first nozzle and a central axis of the second nozzle are separated from each other as going toward the table, the control portion controls the valve mechanism of the discharge mechanism to switch between a first state in which the supply flow path and the first branch flow path communicate with each other and the supply flow path and the second branch flow path are blocked from each other and a second state in which the supply flow path and the second branch flow path communicate with each other and the supply flow path and the first branch flow path are blocked from each other, and the control portion controls the tilting mechanism so that in the first state, the first nozzle is brought closer to the table than the second nozzle and in the second state, the second nozzle is brought closer to the table than the first nozzle.

According to the aspect of the three-dimensional shaping apparatus, the tilting mechanism tilts the discharge mechanism so that a nozzle, between the first nozzle and the second nozzle, which discharges the shaping material is brought to close to the table and a nozzle which stops discharging of the shaping material is separated from the table. Therefore, it is possible to prevent the nozzle which is stopping the discharge of the shaping material from interfering with the three-dimensional shaping object being shaped.

(2) In the aspect of the three-dimensional shaping apparatus, a nozzle diameter of the second nozzle may be larger than a nozzle diameter of the first nozzle.

According to the aspect of the three-dimensional shaping apparatus, when a portion which requires shaping precision is shaped, the first nozzle of a small diameter can be used for shaping, and when a portion which requires a shaping speed is shaped, the second nozzle of a large diameter can be used for shaping. Therefore, since the first nozzle and the second nozzle having different nozzle diameters can be used properly according to application, it is possible to achieve both improvement in the shaping precision and improvement in the shaping speed.

(3) In the aspect of the three-dimensional shaping apparatus, the control portion may perform shaping in the first state when shaping an exterior appearance of a three-dimensional shaping object and perform shaping in the second state when shaping an interior appearance of the three-dimensional shaping object.

According to the aspect of the three-dimensional shaping apparatus, the control portion performs control such that when the exterior appearance which requires the shaping precision is shaped, the shaping is performed using the first nozzle with the small diameter, and when the interior appearance which requires the shaping speed rather than the shaping precision is shaped, the shaping is performed using the second nozzle having the large diameter. Therefore, both improvement in the shaping precision and improvement in the shaping speed can be achieved.

(4) The aspect of the three-dimensional shaping apparatus may include a first suction portion coupled to the first branch flow path and configured to suck the shaping material in the first branch flow path and a second suction portion coupled to the second branch flow path and configured to suck the shaping material in the second branch flow path.

According to the aspect of the three-dimensional shaping apparatus, since the shaping material in the first branch flow path can be sucked by the first suction portion, leakage of the shaping material from the first nozzle can be suppressed. Further, since the shaping material in the second branch flow path can be sucked by the second suction portion, leakage of the shaping material from the second nozzle can be suppressed. Therefore, it is possible to suppress the leakage of the shaping material from a nozzle in which the discharge of the shaping material stops, between the first nozzle and the second nozzle.

(5) In the aspect of the three-dimensional shaping apparatus, the melting portion may include a flat screw having a grooved surface provided with a groove, and a barrel having a facing surface facing the grooved surface of the flat screw and provided with a communication hole communicating with the supply flow path, and a heating portion, and the melting portion may melt the material to generate the shaping material by rotation of the flat screw and heating by the heating portion and supply the shaping material from the communication hole to the supply flow path.

According to the aspect of the three-dimensional shaping apparatus, since the shaping material is generated by a small flat screw, the three-dimensional shaping apparatus can be reduced in size.

(6) According to a second embodiment of the present disclosure, a three-dimensional shaping apparatus is provided. The three-dimensional shaping apparatus includes a first discharge mechanism and a second discharge mechanism which discharge a shaping material, a table on which the shaping material discharged from the first discharge mechanism and the second discharge mechanism is stacked, a tilting mechanism tilting each of the first discharge mechanism and the second discharge mechanism with respect to the table, and a control portion controlling the first discharge mechanism, the second discharge mechanism, and the tilting mechanism. The first discharge mechanism and the second discharge mechanism each include a melting portion melting a material to be used as the shaping material, a supply flow path through which the shaping material supplied from the melting portion flows, a nozzle communicating with the supply flow path, and a flow rate adjustment mechanism provided in the supply flow path and adjusting a flow rate of the shaping material supplied to the nozzle, the control portion controls the flow rate adjustment mechanism to discharge the shaping material from any one of the first discharge mechanism and the second discharge mechanism, and the control portion controls the tilting mechanism so that the nozzle of the first discharge mechanism is brought closer to the table than the nozzle of the second discharge mechanism when the shaping material is discharged from the first discharge mechanism and the shaping material is not discharged from the second discharge mechanism, and the nozzle of the second discharge mechanism is brought closer to the table than the nozzle of the first discharge mechanism when the shaping material is discharged from the second discharge mechanism and the shaping material is not discharged from the first discharge mechanism.

According to the aspect of the three-dimensional shaping apparatus, the tilting mechanism inclines the one having the nozzle that discharges the shaping material out of the first discharge mechanism and the second discharge mechanism, so that among the nozzles of the first discharge mechanism and the second discharge mechanism, the nozzle which discharges the shaping material is closer to the table than the nozzle which is stopping the discharge of the shaping material. Therefore, it is possible to prevent the nozzle which is stopping the discharge of the shaping material from interfering with the three-dimensional shaping object being shaped.

The present disclosure can also be realized in various forms other than the three-dimensional shaping apparatus. For example, it can be realized in a form such as a method of controlling the three-dimensional shaping apparatus and a method of manufacturing the three-dimensional shaping object.

What is claimed is:

1. A three-dimensional shaping apparatus comprising:
a discharge mechanism discharging a shaping material;
a table on which the shaping material discharged from the discharge mechanism is stacked;
a tilting mechanism tilting the discharge mechanism with respect to the table; and
a control portion controlling the discharge mechanism and the tilting mechanism, wherein
the discharge mechanism includes
a melting portion melting a material to be used as the shaping material,
a supply flow path through which the melted material which is supplied as the shaping material from the melting portion flows,
a first branch flow path and a second branch flow path to which the melted material is supplied as the shaping material from the supply flow path,
a coupling portion coupling the supply flow path with the first branch flow path and the second branch flow path,
a first nozzle communicating with the first branch flow path and a second nozzle communicating with the second branch flow path, and
a valve mechanism provided in the coupling portion,
the first nozzle and the second nozzle are disposed in a direction in which a central axis of the first nozzle and a central axis of the second nozzle are separated from each other as going toward the table,
the control portion controls the valve mechanism of the discharge mechanism to switch between a first state in which the supply flow path and the first branch flow path communicate with each other and the supply flow path and the second branch flow path are blocked from each other and a second state in which the supply flow path and the second branch flow path communicate with each other and the supply flow path and the first branch flow path are blocked from each other, and
the control portion controls the tilting mechanism so that in the first state, the first nozzle is brought closer to the table than the second nozzle and in the second state, the second nozzle is brought closer to the table than the first nozzle.

2. The three-dimensional shaping apparatus according to claim 1, wherein a nozzle diameter of the second nozzle is larger than a nozzle diameter of the first nozzle.

3. The three-dimensional shaping apparatus according to claim 2, wherein the control portion performs shaping in the first state when shaping an exterior appearance of a three-dimensional shaping object and performs shaping in the second state when shaping an interior appearance of the three-dimensional shaping object.

4. The three-dimensional shaping apparatus according to claim 1, further comprising:
a first suction portion coupled to the first branch flow path and configured to suck the shaping material in the first branch flow path; and
a second suction portion coupled to the second branch flow path and configured to suck the shaping material in the second branch flow path.

5. The three-dimensional shaping apparatus according to claim 1, wherein
the melting portion includes
a flat screw having a grooved surface provided with a groove, and
a barrel having a facing surface facing the grooved surface of the flat screw and provided with a communication hole communicating with the supply flow path, and a heating portion, and
the melting portion melts the material to generate the shaping material by rotation of the flat screw and heating by the heating portion and supplies the shaping material from the communication hole to the supply flow path.

6. A three-dimensional shaping apparatus, comprising:
a first discharge mechanism and a second discharge mechanism which discharge a shaping material;
a table on which the shaping material discharged from the first discharge mechanism and the second discharge mechanism is stacked;

a tilting mechanism tilting each of the first discharge mechanism and the second discharge mechanism with respect to the table; and a control portion controlling the first discharge mechanism, the second discharge mechanism, and the tilting mechanism, wherein the first discharge mechanism and the second discharge mechanism each include a melting portion melting a material to be used as the shaping material, a supply flow path through which the melted material which is supplied as the shaping material from the melting portion flows, a nozzle communicating with the supply flow path, and a flow rate adjustment mechanism provided in the supply flow path and adjusting a flow rate of the shaping material supplied to the nozzle, the control portion controls the flow rate adjustment mechanism to discharge the shaping material from any one of the first discharge mechanism and the second discharge mechanism, and the control portion controls the tilting mechanism so that the nozzle of the first discharge mechanism is brought closer to the table than the nozzle of the second discharge mechanism when the shaping material is discharged from the first discharge mechanism and the shaping material is not discharged from the second discharge mechanism, and the nozzle of the second discharge mechanism is brought closer to the table than the nozzle of the first discharge mechanism when the shaping material is discharged from the second discharge mechanism and the shaping material is not discharged from the first discharge mechanism.

7. The three-dimensional shaping apparatus according to claim 5, wherein a height of the flat screw is smaller than a diameter of the flat screw.

* * * * *